(12) United States Patent
Bando et al.

(10) Patent No.: US 9,290,199 B2
(45) Date of Patent: Mar. 22, 2016

(54) ELECTRIC POWER STEERING SYSTEM

(71) Applicant: JTEKT CORPORATION, Osaka-shi, Osaka (JP)

(72) Inventors: Yuki Bando, Shiki-gun (JP); Ryo Omata, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 430 days.

(21) Appl. No.: 13/719,976

(22) Filed: Dec. 19, 2012

(65) Prior Publication Data
US 2013/0161114 A1 Jun. 27, 2013

(30) Foreign Application Priority Data

Dec. 26, 2011 (JP) .................................. 2011-284356
Jan. 17, 2012 (JP) .................................. 2012-007390
Jan. 17, 2012 (JP) .................................. 2012-007391

(51) Int. Cl.
*B62D 5/04* (2006.01)
*F16C 27/06* (2006.01)
*F16C 19/06* (2006.01)
*F16C 19/18* (2006.01)

(52) U.S. Cl.
CPC ................ *B62D 5/0448* (2013.01); *B62D 5/04* (2013.01); *F16C 27/066* (2013.01); *F16C 19/06* (2013.01); *F16C 19/184* (2013.01)

(58) Field of Classification Search
CPC ...... B62D 5/04; B62D 5/0403; B62D 5/0421; B62D 5/0424; B62D 5/0442; B62D 5/0445; B62D 5/0448

USPC .......................................... 180/443, 444, 446
See application file for complete search history.

(56) References Cited

U.S. PATENT DOCUMENTS

| | | | | |
|---|---|---|---|---|
| 6,883,635 B2* | 4/2005 | Lynn et al. | ..................... | 180/444 |
| 7,025,169 B2* | 4/2006 | Tatewaki et al. | .............. | 180/444 |
| 7,628,087 B2* | 12/2009 | Gerbier et al. | ............... | 74/89.23 |
| 8,307,940 B2* | 11/2012 | Bugosh et al. | ................ | 180/444 |
| 8,540,258 B2* | 9/2013 | Bae et al. | .................. | 280/93.515 |
| 8,689,927 B2* | 4/2014 | Yamamoto et al. | ........... | 180/444 |

(Continued)

FOREIGN PATENT DOCUMENTS

DE    10 2004 034 701 A1    2/2006
DE    10 2010 029 767 A1    12/2011

(Continued)

OTHER PUBLICATIONS

Mar. 3, 2014 Extended European Search Report issued in European Application No. 12198686.3.
Oct. 27, 2015 Office Action issued in Japanese Patent Application No. 2012-007390.

*Primary Examiner* — Joseph Rocca
*Assistant Examiner* — Marc A Scharich
(74) *Attorney, Agent, or Firm* — Oliff PLC

(57) ABSTRACT

An electric power steering system includes: an annular elastic member that is made of resin, that is arranged between an inner end face of a housing and an outer ring of a bearing that supports a cylindrical member that rotates coaxially with a rack shaft, and that supports the cylindrical member such that the cylindrical member is movable in the axial direction with respect to the housing; and a supporting member that restricts axial movement of the cylindrical member within a predetermined range, and that restricts radially inward movement of the elastic member.

10 Claims, 12 Drawing Sheets

(56) References Cited

U.S. PATENT DOCUMENTS

| | | |
|---|---|---|
| 8,813,903 B2 * | 8/2014 | Asakura et al. ............... 180/444 |
| 2003/0121714 A1 * | 7/2003 | Okada et al. ................. 180/443 |
| 2010/0319471 A1 | 12/2010 | Nam et al. |
| 2011/0127742 A1 | 6/2011 | Bae et al. |
| 2013/0248279 A1 | 9/2013 | Rupp et al. |

FOREIGN PATENT DOCUMENTS

| | | |
|---|---|---|
| EP | 2 049 383 B1 | 12/2009 |
| JP | A-2002-145080 | 5/2002 |
| WO | WO 2008/017541 A1 | 2/2008 |
| WO | WO 2012/065868 A1 | 5/2012 |

* cited by examiner

ELECTRIC POWER STEERING SYSTEM

INCORPORATION BY REFERENCE/RELATED APPLICATION

This application claims priority to Japanese Patent Applications No. 2011-284356 filed on Dec. 26, 2011, No. 2012-007390 filed on Jan. 17, 2012 and No. 2012-007391 filed on Jan. 17, 2012 the disclosure of which, including the specification, drawings and abstract, is incorporated herein by reference in its entirety.

BACKGROUND OF THE INVENTION

1. Field of the Invention

The invention relates to an electric power steering system that includes a cylindrical member that rotates coaxially with a rack shaft.

2. Discussion of Background

In an electric power steering system that includes a cylindrical member that rotates coaxially with a rack shaft, the rack shaft makes a reciprocating motion in its axial direction in response to a driver's operation of a steering wheel. As a result, the steered angle of steered wheels of a vehicle, that is, the travelling direction of the vehicle, is changed.

In some electric power steering systems, assist force is applied to a rack shaft from a motor. In such electric power steering systems, a ball screw nut through which the rack shaft is passed and which has a thread groove in its inner periphery is arranged, and the ball screw nut is rotated by the motor. A plurality of balls is arranged in a rolling passage that is formed between the thread groove of the ball screw nut, which serves as a cylindrical member, and a thread groove formed in the outer periphery of the rack shaft. A rotational motion that is generated by driving the motor is converted into an axial linear motion of the rack shaft via the ball screw nut and the balls.

In an electric power steering system, a bearing is arranged between a housing and a ball screw nut, and the ball screw nut is supported by the housing. WO 20081017541 A1 describes a configuration in which an elastic support mechanism is arranged. The elastic support mechanism elastically supports a bearing such that the bearing is movable (slightly movable) in the axial direction of a ball screw nut. Tooth noise is reduced by suppressing axial vibrations of the ball screw nut, and the steering feel at the start of turning a steering wheel is improved.

Specifically, as shown in FIG. 15, in each elastic support mechanism 90, an annular rubber member 91 that serves as an elastic member and an annular stopper 92 that serves as a supporting member are arranged in pair, and elastically support a bearing 93. The annular rubber member 91 is held between an end face 94a of an outer ring 94 of the bearing 93 and an inner end face 95a of a housing 95 with the annular stopper 92 interposed between the annular rubber member 91 and the outer ring 94, and elastically supports the outer ring 94 of the bearing 93 with respect to the housing 95.

The annular stopper 92 has an L-shape in section. The annular stopper 92 is held between the end face 94a of the outer ring 94 of the bearing 93 and an end face 91a of the annular rubber member 91, and is formed so as to be stretched between an inner periphery 95b of the housing 95 and an outer periphery 91b of the annular rubber member 91. When the annular rubber member 91 is not compressed with a predetermined load in the axial direction, the annular stopper 92 does not contact the inner end face 95a of the housing 95, and a clearance is formed between the annular stopper 92 and the inner end face 95a. On the other hand, when the annular rubber member 91 is compressed with the predetermined load in the axial direction, the annular stopper 92 contacts the inner end face 95a of the housing 95. Therefore, it is possible to prevent excess compression of the annular rubber member 91.

In such an electric power steering system, the annular stopper 92 is arranged on the outer periphery 91b of the annular rubber member 91. However, there is a possibility that the annular rubber member 91 may slip radially inward due to, for example, compression of the annular rubber member 91, and, as a result, the annular rubber member 91 may fail to deform in response to its compression and the driver's steering feel may deteriorate.

SUMMARY OF THE INVENTION

The invention provides an electric power steering system in which an elastic member that supports a cylindrical member that rotates coaxially with a rack shaft is appropriately arranged, thereby suppressing deterioration of the driver's steering feel.

According to a feature of an example of the invention, an electric power steering system includes a supporting member that restricts axial movement of a cylindrical member within a predetermined range and that restricts radially inward movement of an elastic member.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
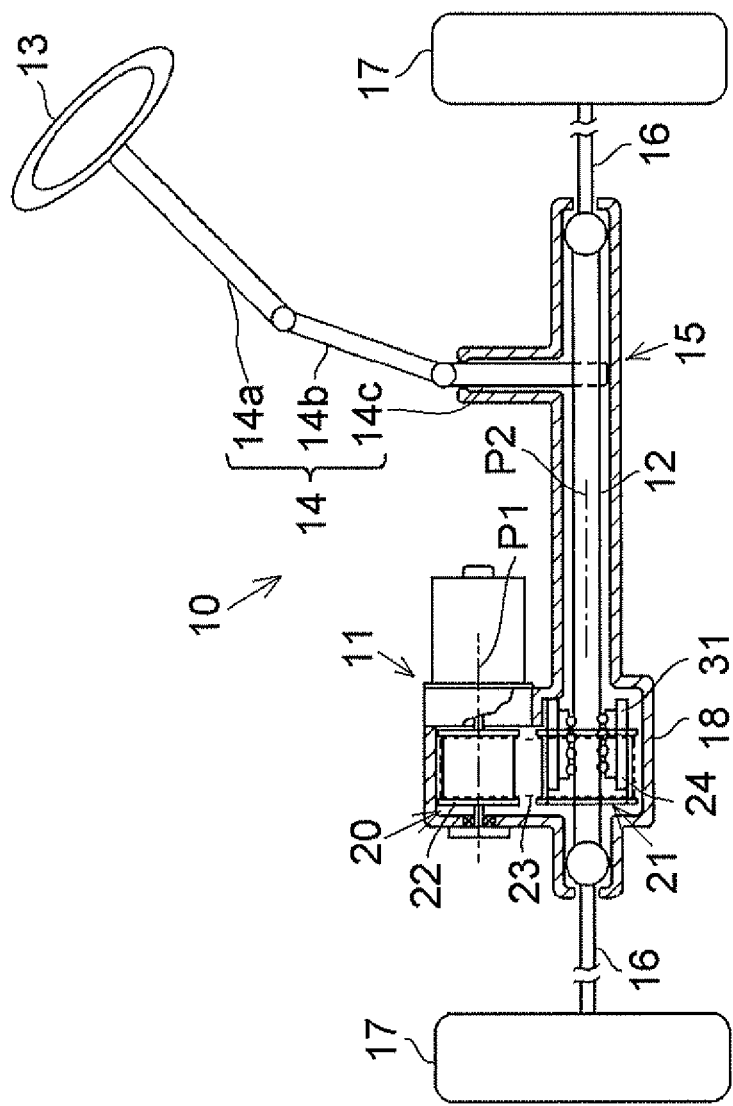
FIG. 1 is schematic view that illustrates an electric power steering system according to a first embodiment of the invention.
Figure 2:
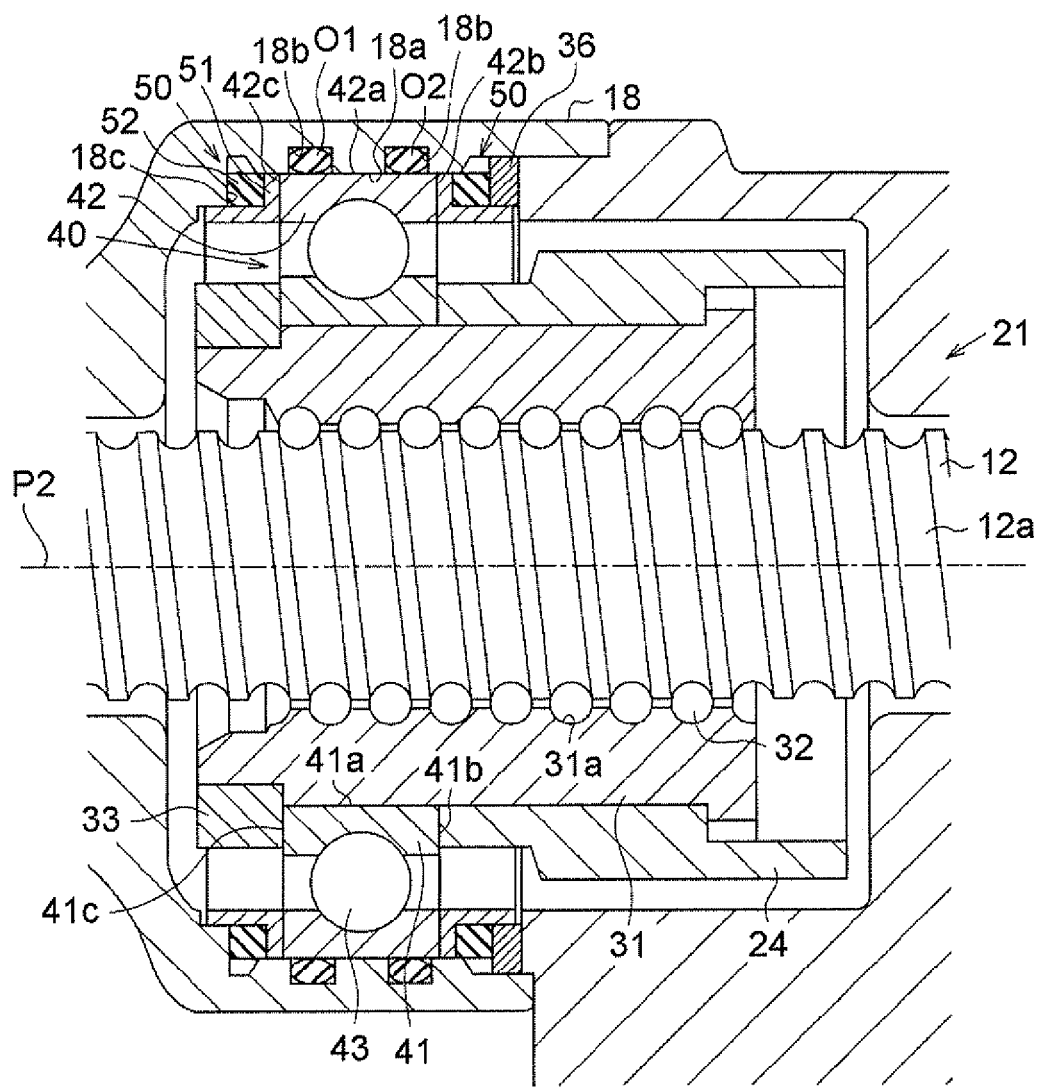
FIG. 2 is a sectional view that shows a ball screw mechanism according to the first embodiment.

A first example embodiment of the invention will be described with reference to FIG. 1 to FIG. 3. As shown in FIG. 1, an electric power steering system 10 that serves as a steering system for a vehicle is a rack parallel-type system in which a motor 11 is installed such that a rotation axis P1 of the motor 11 is substantially parallel to a rotation axis P2 of a rack shaft 12 that serves as an output member. The electric power steering system 10 includes a steering shaft 14 to which a steering wheel 13 is fixed. The steering shaft 14 is coupled to the rack shaft 12 via a rack-and-pinion mechanism 15. The rotation of the steering shaft 14 in response to a steering operation is converted into a reciprocating linear motion of the rack shaft 12 by the rack-and-pinion mechanism 15.

The steering shaft 14 according to the present embodiment is formed by coupling a column shaft 14a, an intermediate shaft 14b and a pinion shaft 14c to each other. The reciprocating linear motion of the rack shaft 12 in accordance with the rotation of the steering shaft 14 is transmitted to knuckles (not shown) via tie rods 16 coupled to respective ends of the rack shaft 12. As a result, the steered angle of steered wheels 17, that is, the travelling direction of the vehicle is changed.

The electric power steering system 10 includes a housing 18 through which the rack shaft 12 is passed. The motor 11 is fitted to the housing 18. A speed reduction mechanism 20, a ball screw mechanism 21, and the like, are accommodated in the housing 18. The speed reduction mechanism 20 is used to transmit driving force from the motor 11 to the rack shaft 12. The ball screw mechanism 21 serves as a conversion mechanism.

The motor 11 is driven in response to movement of the rack shaft 12. That is, the motor 11 is driven in response to the rotation of the steering shaft 14. Therefore, the motor 11 is not driven immediately after an operation of the steering wheel 13 is started. For example, when a steered angle is small during high-speed travelling, the motor 11 is not driven.

The speed reduction mechanism 20 according to the present embodiment includes a drive pulley 22, a driven pulley 24 and a belt 23. The drive pulley 22 is fixed to the motor 11 and rotates together with the motor 11. The driven pulley 24 is rotatable about the rotation axis P2 of the rack shaft 12. The belt 23 is looped over the pulleys 22, 24. The drive pulley 22 rotates as the motor 11 is driven. Rotation is transmitted from the drive pulley 22 to the driven pulley 24 via the belt 23. The driven pulley 24 is screwed to the ball screw mechanism 21, and is rotated together with the ball screw mechanism 21 by the transmitted rotation.

The ball screw mechanism 21 according to the present embodiment will be described below with reference to FIG. 2. As shown in FIG. 2, the ball screw mechanism 21 includes a sleeve-shaped ball screw nut 31 and a plurality of balls 32. The ball screw nut 31 is configured to be rotatable together with the driven pulley 24. The balls 32 are arranged between the ball screw nut 31 and the rack shaft 12 in a radial direction about the rotation axis P2. Note that, in the present embodiment, a direction along the rotation axis P2 will be simply referred to as "axial direction".

A thread groove 31a is formed in the inner periphery of the ball screw nut 31. A thread groove 12a is formed in the outer periphery of the rack shaft 12. The balls 32 are arranged in a rolling passage that is formed between the thread groove 12a formed in the outer periphery of the rack shaft 12 and the thread groove 31a formed in the inner periphery of the ball screw nut 31.

In this way, the ball screw mechanism 21 is formed by screwing the rack shaft 12 to the ball screw nut 31 via the balls 32. That is, the rack shaft 12 is coaxially passed through the ball screw nut 31, and the rotation of the ball screw nut 31 is transmitted to the rack shaft 12 as assist force via the balls 32.

In the present embodiment, the driven pulley 24 and the ball screw nut 31 may function as a cylindrical member. In the present embodiment, a portion in which the thread groove 31a, which may function as a first thread groove, is formed may function as a first thread portion, and a portion in which the thread groove 12a, which may function as a second thread groove, is formed may function as a second thread portion.

The ball screw nut 31 is rotatably supported by the housing 18 via a bearing 40. The bearing 40 is a ball bearing that includes an inner ring 41, an outer ring 42 and spherical rolling elements 43 that are interposed between the inner ring 41 and the outer ring 42.

An inner periphery 41a of the inner ring 41 of the bearing 40 is in contact with the ball screw nut 31. One axial end face 41b of the inner ring 41 of the bearing 40 is in contact with the driven pulley 24, and the other axial end face 41c of the inner ring 41 is in contact with a nut 33. The nut 33 is screwed to an outer periphery of the ball screw nut 31. In this way, the inner periphery 41a of the inner ring 41 of the bearing 40 supports the ball screw nut 31 such that the ball screw nut 31 is rotatable.

An outer periphery 42a of the outer ring 42 of the bearing 40 is in contact with an inner periphery 18a of the housing 18. In the present embodiment, groove portions 18b are formed in the inner periphery 18a of the housing 18 so as to face the outer periphery 42a of the outer ring 42, and O rings O1, O2 are arranged in the respective groove portions 18b. In this way, the O rings O1, O2 are held between the groove portions 18b of the housing 18 and the outer periphery 42a of the outer ring 42.

Axial end faces 42b, 42c of the outer ring 42 of the bearing 40 are in contact with respective elastic support mechanisms 50. Each elastic support mechanism 50 is formed of an annular supporting member 51 made of resin and an annular elastic member 52 made of rubber, and elastically supports the outer ring 42 of the bearing 40 such that the outer ring 42 is able to be displaced in the axial direction. The outer ring 42 of the bearing 40 is provided together with the inner ring 41 of the bearing 40 via the rolling elements 43, and the inner ring 41 of the bearing 40 is fixedly fitted to the ball screw nut 31. That is, the elastic support mechanisms 50 support the ball screw nut 31 and the driven pulley 24 via the bearing 40 such that the ball screw nut 31 and the driven pulley 24 are able to be displaced in the axial direction.

An annular retained member 36 is arranged between the housing 18 and the elastic member 52 of the elastic support mechanism 50 that is located close to the end face 42b of the outer ring 42 of the bearing 40. The retained member 36 axially contacts the elastic member 52 along the whole circumference of the elastic member 52, and is arranged so as to face the end face of the elastic member 52 along the entire circumferential circumference. An opening (not shown) for insertion of the belt 23 is formed in the inner periphery 18a of the housing 18. The opening formed in the housing 18 is arranged so as to face one of the elastic members 52. However, because the retained member 36 is held between the housing 18 and the one of the elastic members 52, it is possible to retain the elastic member 52 uniformly in the axial direction. In the present embodiment, the retained member 36 may also function as a housing according to the invention.

In the present embodiment, the inside diameter of the retained member 36 and the inside diameter of each supporting member 51 are larger than the outside diameter of the ball screw nut 31 and the outside diameter of the driven pulley 24. Therefore, even after the ball screw nut 31 and the driven pulley 24 are fitted in the housing 18, it is possible to easily fit the retained member 36, the supporting members 51 and the elastic members 52 into the housing 18.

The elastic support mechanisms 50 according to the present embodiment will be described below with reference to FIG. 3. The elastic support mechanism 50 that is in contact with the end face 42c of the outer ring 42 of the bearing 40 has the same shape as the elastic support mechanism 50 that is in contact with the end face 42b. Therefore, the elastic support mechanism 50 that is in contact with the end face 42c of the outer ring 42 of the bearing 40 will be mainly described, and the description on the elastic support mechanism 50 that is in contact with the end face 42b is omitted.

The outside diameter of the supporting member 51 is slightly smaller than the inside diameter of the housing 18. Therefore, as shown in FIG. 3, an outer periphery 51a of the supporting member 51 is arranged so as to be in contact with the inner periphery 18a of the housing 18.

The supporting member 51 has an annular retained portion 51c that has a contact face 51b that is located close to the outer ring 42 of the bearing 40. The contact face 51b has a planar shape as in the case of the end face 42c of the outer ring 42 of the bearing 40. Therefore, the contact face 51b is in contact with the end face 42c of the outer ring 42 of the bearing 40, and supports the outer ring 42 of the bearing 40. In this way, the retained portion 51c is retained by the outer ring 42 of the bearing 40 and the elastic member 52.

The supporting member 51 has an annular (cylindrical) restricting portion 51d that extends from the retained portion 51c toward an inner end face 18c of the housing 18. In the present embodiment, the restricting portion 51d is formed along the whole circumference of the supporting member 51. An outer periphery 51e of the restricting portion 51d is in contact with an inner periphery 52c of the elastic member 52. In this way, the restricting portion 51d is arranged radially inward of the elastic member 52. Thus, the restricting portion 51d restricts radially inward movement of the elastic member 52.

An annular step portion 18d is formed in the inner end face 18c of the housing 18. The step portion 18d is formed along the whole circumference of the housing 18 so as to face the end face 42c of the outer ring 42 of the bearing 40. The inner end face 18c is formed of a first inner end face 18e and a second inner end face 18f.

The second inner end face 18f is parallel to the first inner end face 18e that contacts the elastic member 52, and is formed at a position radially inward of the first inner end face 18e and farther from the outer ring 42 of the bearing 40 than the first inner end face 18e. An inner periphery 18g of the step portion 18d is formed along the axial direction, and is in contact with the outer periphery 51e of the restricting portion 51d of the supporting member 51.

In this way, a space surrounded by the inner periphery 18a and first inner end face 18e of the housing 18, the retained portion 51c and the restricting portion 51d is used as an accommodating portion 53 that accommodates the elastic member 52. The accommodating portion 53 is formed radially outward of the supporting member 51, and does not communicate with a space radially inward of the elastic member 52. Therefore, the elastic member 52 does not move radially inward through any portion.

A relief portion 18h, which is a recess, is formed in the inner periphery 18a of the housing 18 so as to face the elastic member 52, and a clearance 55 is formed between the outer periphery 52d of the elastic member 52 and the relief portion 18h. The relief portion 18h is formed in order to allow the elastic member 52 to escape into the clearance 55 and is deformed when the elastic member 52 is compressed in the axial direction. The relief portion 18h is formed in the inner periphery 18a of the housing 18 along the whole circumference.

In the present embodiment, a chamfered portion 18m is formed in the relief portion 18h so as to be tilted with respect to the radial direction toward the outer ring 42 of the bearing 40. Because the chamfered portion 18m is formed in this way, it is easy to deform the elastic member 52 such that the elastic member 52 escapes into the clearance 55 in the relief portion 18h. After that, it is easy to deform the deformed elastic member 52 such that the elastic member 52 returns to the accommodating portion 53. On the other hand, no chamfered portion is formed in a portion of the relief portion 18h, which is close to the first inner end face 18e of the housing 18. By effectively utilizing the space in this way, it is possible to ensure a sufficient volume of the clearance 55 in the relief portion 18h.

When the elastic member 52 is accommodated in the accommodating portion 53, if the elastic member 52 is not compressed with a predetermined load in the axial direction, one end face 52a of the elastic member 52 is in contact with the retained portion 51c of the supporting member 51, and the other end face 52b of the elastic member 52 is in contact with the first inner end face 18e. In addition, a clearance 54 is formed between an end face 51f of the restricting portion 51d of the supporting member 51 and the second inner end face 18f of the step portion 18d.

On the other hand, when the elastic member 52 is accommodated in the accommodating portion 53, if the elastic member 52 is compressed with the predetermined load in the axial direction, the elastic member 52 deforms radially outward so as to escape into the relief portion 18h. The outer periphery 51a of the retained portion 51c of the supporting member 51 slides on the inner periphery 18a of the housing 18, the outer periphery 51e of the restricting portion 51d of the supporting member 51 slides on the inner periphery 18g of the step portion 18d, and the supporting member 51 moves in the axial direction. The end face 51f of the restricting portion 51d of the supporting member 51 contacts the second inner end face 18f of the step portion 18d, and the clearance 54 is not formed. In this way, the end face 51f of the restricting portion 51d contacts the second inner end face 18f. Thus, it is possible to restrict axial movement of the outer ring 42 of the bearing 40 within a predetermined range, and to suppress excess compression of the elastic member 52.

In the present embodiment, a distance d1 over which the end face 51f of the restricting portion 51d needs to move in order to contact the second inner end face 18f is slightly shorter than a distance d2 over which the outer periphery 51a of the retained portion 51c of the supporting member 51 needs to move in order to reach the chamfered portion 18m of the relief portion 18h. That is, even when the supporting member 51 moves in the axial direction, the end face 51f of the restricting portion 51d contacts the second inner end face 18f, and therefore the outer periphery 51*a* of the retained portion 51*c* does not reach the relief portion 18*h*.

The outer periphery 51*e* of the restricting portion 51*d* is in contact with the inner periphery 18*g* of the step portion 18*d*, and no clearance is formed between the inner periphery 18*g* of the step portion 18*d* and the outer periphery 51*e* of the restricting portion 51*d*. The end face 51*f* of the restricting portion 51*d* is arranged closer to the second inner end face 18*f* than the first inner end face 18*e*. Therefore, even when the supporting member 51 moves in the axial direction and the elastic member 52 is compressed in the axial direction, the elastic member 52 is retained so as to be surrounded by the first inner end face 18*e* of the housing 18, the end face 42*c* of the outer ring 42 of the bearing 40 and the outer periphery 51*e* of the restricting portion 51*d* of the supporting member 51. Therefore, the elastic member 52 is not caught between the outer periphery 51*e* of the restricting portion 51*d* and the inner periphery 18*g* of the step portion 18*d* or between the end face 51*f* of the restricting portion 51*d* and the first inner end face 18*e*.

The elastic member 52 is a member having elasticity, and is a member that allows the outer ring 42 of the bearing 40 to be displaced in the axial direction. One end face 52*a* of the elastic member 52 is in contact with the retained portion 51*c*, and the other end face 52*b* of the elastic member 52 is in contact with the first inner end face 18*e*. As a result, the elastic member 52 is retained between the retained portion 51*c* and the first inner end face 18*e*.

The inner periphery 52*c* of the elastic member 52 is in contact with the outer periphery 51*e* of the restricting portion 51*d* of the supporting member 51. Thus, radially inward deformation of the elastic member 52 is restricted. On the other hand, the relief portion 18*h* is formed adjacent to the outer periphery 52*d* of the elastic member 52. Therefore, when the elastic member 52 is compressed in the axial direction, the elastic member 52 deforms so as to escape into the relief portion 18*h*. In the present embodiment, the supporting member 51 and the elastic member 52 are not bonded to each other by an adhesive agent, and the supporting member 51 and the elastic member 52 are fixedly arranged.

The operation of the above-configured electric power steering system 10 will be described below. In the electric power steering system 10, the drive pulley 22 is fixed to the motor 11. The belt 23 is looped over the pulleys 22, 24. The driven pulley 24 is screwed to the ball screw nut 31. The ball screw nut 31 is supported with respect to the housing 18 by the inner periphery 41*a* of the inner ring 41 of the bearing 40.

One end face 41*b* of the inner ring 41 of the bearing 40 is in contact with the driven pulley 24, and the other end face 41*c* of the inner ring 41 is in contact with the nut 33. Thus, the inner ring 41 of the bearing 40 is arranged so as to be rotatable together with the ball screw nut 31 and the driven pulley 24. The outer periphery 42*a* of the outer ring 42 of the bearing 40 is in contact with the inner periphery 18*a* of the housing 18, and both end faces 42*b*, 42*c* of the outer ring 42 of the bearing 40 are elastically supported by the respective elastic support mechanisms 50.

In each elastic support mechanism 50, the elastic member 52 is accommodated in the accommodating portion 53 formed by the supporting member 51 and the housing 18. Specifically, the one end face 52*a* of the elastic member 52 is in contact with the retained portion 51*c* of the supporting member 51. The other end face 52*b* of the elastic member 52 is in contact with the first inner end face 18*e*. The inner periphery 52*c* of the elastic member 52 is in contact with the outer periphery 51*e* of the restricting portion 51*d*. The outer periphery 52*d* of the elastic member 52 faces the relief portion 18*h*, and the clearance 55 is formed between the outer periphery 52*d* and the relief portion 18*h*. The outer periphery 51*a* of the supporting member 51 is in contact with the inner periphery 18*a* of the housing 18. The outer periphery 51*e* of the restricting portion 51*d* is in contact with the inner periphery 18*g* of the step portion 18*d*.

In this way, the elastic members 52 elastically support the end faces 42*b*, 42*c* of the outer ring 42 of the bearing 40 via the supporting members 51. When the elastic members 52 are not compressed with the predetermined load in the axial direction, the end face 51*f* of the restricting portion 51*d* is not in contact with the second inner end face 18*f*.

When the steering wheel 13 is operated by a driver, the rotational motion of the steering wheel 13 is transmitted to the rack-and-pinion mechanism 15 via the steering shaft 14, and the reciprocating linear motion of the rack shaft 12 is performed.

As described above, at so-called turning start timing at which the operation of the steering wheel 13 is just started, the motor 11 has not been driven yet. Therefore, in a state where no assist force is applied to the rack shaft 12, the rack shaft 12 makes a reciprocating linear motion through a driver's operation of the steering wheel 13.

When the reciprocating linear motion of the rack shaft 12 is performed, friction is generated between the rack shaft 12 and the balls 32 arranged in the thread groove 12*a* which is formed in the outer periphery of the rack shaft 12. Accordingly, friction is generated between the balls 32 and the ball screw nut 31, between the ball screw nut 31 and the bearing 40, and between the bearing 40 and the elastic support mechanisms 50.

The force in the axial direction in which the rack shaft 12 makes a reciprocating linear motion is transmitted through the outer ring 42 of the bearing 40 to one of the elastic support mechanisms 50. In each elastic support mechanism 50, axial force for making a reciprocating linear motion is transmitted to the corresponding elastic member 52 via the supporting member 51 that is in contact with the outer ring 42 of the bearing 40. Then, the elastic member 52 that is in contact with the first inner end face 18*e* of the housing 18 is compressed in the axial direction and is deformed, and the supporting member 51 moves in the axial direction.

As the supporting member 51 moves in the axial direction in this way, mainly, the bearing 40, the ball screw nut 31 and the balls 32 move in the axial direction in which the rack shaft 12 makes a reciprocating linear motion. Therefore, at the start timing of turning the steering wheel 13, it is possible to improve the driver's steering feel and suppress tooth noise by reducing friction force based on the reciprocating linear motion of the rack shaft 12.

Even when the elastic member 52 is compressed in the axial direction, the elastic member 52 is prevented from slipping off radially inward because the radially inner side portion of the elastic member 52 is in contact with the outer periphery 51*e* of the restricting portion 51*d*.

Even when the elastic member 52 is compressed in the axial direction, the elastic member 52 is displaced so as to escape into the clearance 55 of the relief portion 18*h* formed radially outward of the elastic member 52. Particularly, because the chamfered portion 18*m* is formed in the relief portion 18*h*, it is possible to smoothly deform the elastic member 52.

The outer periphery 51*a* of the supporting member 51 is in contact with the inner periphery 18*a* of the housing 18, and the outer periphery 51*e* of the restricting portion 51*d* is in contact with the inner periphery 18*g* of the step portion 18*d*. Therefore, the supporting member 51 is able to smoothly move along the inner periphery 18a of the housing 18 and the inner periphery 18g of the step portion 18d (axial direction).

The outer periphery 51e of the restricting portion 51d of the supporting member 51 is in contact with the inner periphery 18g of the step portion 18d, and there is no clearance between the outer periphery 51e and the inner periphery 18g. Therefore, even when the supporting member 51 moves in the axial direction, the elastic member 52 is not caught between the supporting member 51 and the housing 18.

The end face 51f of the restricting portion 51d of the supporting member 51 does not contact the second inner end face 18f when the elastic member 52 is not compressed with the predetermined load in the axial direction. However, the end face 51f contacts the second inner end face 18f when the elastic member 52 is compressed with the predetermined load in the axial direction. Therefore, the supporting member 51 restricts axial movement of the bearing 40, the ball screw nut 31, the driven pulley 24, and the like. This prevents a large load from acting on the elastic member 52.

In this way, as the motor 11 rotates, the drive pulley 22 rotates, and the driven pulley 24 rotates via the belt 23. As the driven pulley 24 rotates, the ball screw nut 31 rotates, and assist force is supplied to the reciprocating linear motion of the rack shaft 12 via the balls 32.

As described in detail above, the present embodiment has the following advantageous effects.

(1) The elastic members 52 support the ball screw nut 31 and the driven pulley 24 (cylindrical member), which rotate coaxially with the rack shaft 12, via the bearing 40 such that the ball screw nut 31 and the driven pulley 24 are movable in the axial direction. The supporting members 51 restrict axial movement of the bearing 40, the ball screw nut 31 and the driven pulley 24 within a predetermined range, and restrict radially inward movement of the elastic members 52 such that the elastic members 52 do not slip off radially inward. Therefore, by appropriately arranging the elastic members 52, it is possible to suppress deterioration of the driver's steering feel.

(2) The outer periphery 51e of the restricting portion 51d that is arranged radially inward of the elastic member 52 and that restricts radially inward movement of the elastic member 52 slides over the inner periphery 18g of the step portion 18d. In this way, the supporting member 51 is moved in the axial direction. Therefore, it is possible to prevent the elastic member 52 from being caught between the supporting member 51 and the first inner end face 18e of the housing 18. Thus, by appropriately arranging the elastic member 52, it is possible to suppress deterioration of the driver's steering feel.

(3) The relief portion 18h that is a recess and that faces the elastic member 52 is formed. Therefore, it is possible to smoothly cause the elastic member 52 to escape into the relief portion 18h. Particularly, the relief portion 18h has the chamfered portion 18m formed at a position close to the outer ring 42 of the bearing 40. Therefore, the elastic member 52 that is deformed so as to escape into the relief portion 18h easily returns to the accommodating portion 53 in which the elastic member 52 is originally arranged.

(4) Each supporting member 51 has the annular retained portion 51c arranged between the outer ring 42 of the bearing 40 and the elastic member 52, and the restricting portion 51d has a cylindrical shape that extends from the retained portion 51c in the axial direction. Therefore, each supporting member 51 is able to easily support the annular elastic member 52 using the retained portion 51c and the restricting portion 51d. Therefore, it is possible to easily fit the elastic member 52 and the supporting member 51 to the housing 18.

(5) The restricting portion 51d of each supporting member 51 has both the function of restricting radially inward movement of the elastic member 52 and the function of restricting axial movement of the supporting member 51. As a result, it is possible to effectively use the space when the supporting member 51 and the elastic member 52 are arranged.

(6) Each supporting member 51 is fitted to the housing 18 such that the outer periphery 51a is in contact with the inner periphery 18a of the housing 18 and the outer periphery 51e of the restricting portion 51d is in contact with the inner periphery 18g of the step portion 18d. As a result, it is possible to stabilize each supporting member 51. In addition, each supporting member 51 easily moves in the axial direction, and therefore it is possible to smoothly move the ball screw nut 31, the driven pulley 24 and the bearing 40 in the axial direction.

(7) The inside diameter of each supporting member 51 is larger than the outside diameter of each of the ball screw nut 31 and the driven pulley 24. Therefore, after the ball screw nut 31 and the driven pulley 24 are fitted into the housing 18, it is possible to easily fit the supporting members 51 and the elastic members 52 to the housing 18.

(8) Each elastic member 52 is not bonded to the corresponding supporting member 51 by an adhesive agent. Each elastic member 52 is configured so as not to slip off radially inward of the elastic member 52. Therefore, it is possible to prevent curing of the elastic member due to an adhesive agent. In addition, because it is possible to omit bonding process, it is possible to reduce the number of processes at the time of assembly.

Next, a second example embodiment of the invention will be described below. In the following description, the same components as those in the above-described first embodiment will be denoted by the same reference numerals as those in the first embodiment, and the description thereof will be omitted or simplified.

Figure 3:
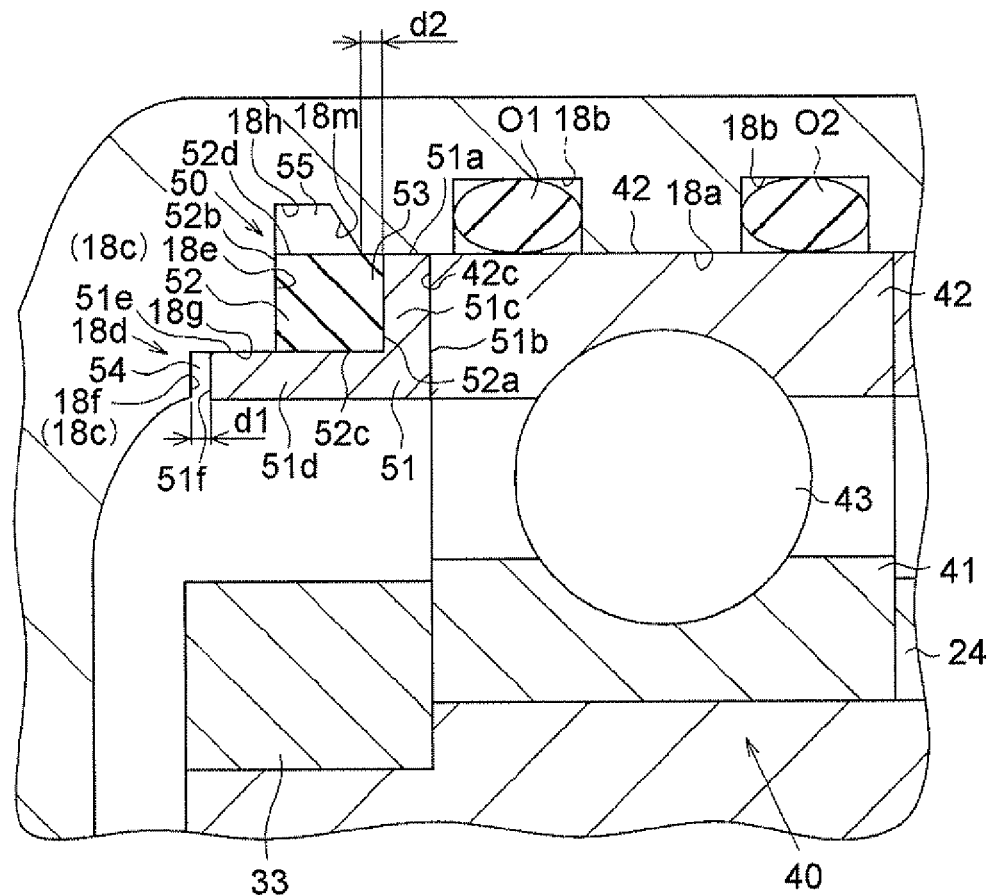
FIG. 3 is a sectional view that shows an elastic support mechanism according to the first embodiment.
Figures 4A, 4B:
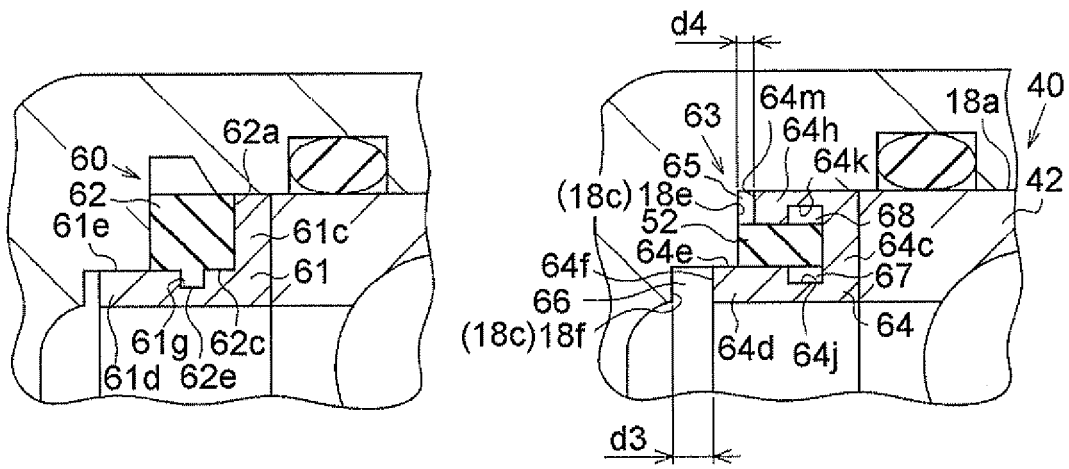
FIG. 4A is a schematic view that illustrates an elastic support mechanism according to a second embodiment of the invention.
FIG. 4B is a schematic view that illustrates an elastic support mechanisms according to a third embodiment of the invention.

In the first embodiment, as shown in FIG. 3, each supporting member 51 and the corresponding elastic member 52 are not engaged with each other. In contrast to this, in the second embodiment, as shown in FIG. 4A, in each elastic support mechanism 60, engagement portions that engage with each other may be formed in the supporting member 61 and the elastic member 62. The elastic support mechanism 60 that is in contact with the end face 42c of the outer ring 42 of the bearing 40 will be mainly described, and the description on the elastic support mechanism 60 that has the same shape as the above-mentioned elastic support mechanism 60 and that is in contact with the end face 42b is omitted.

Specifically, a recess 61g is formed in an outer periphery 61e of a restricting portion 61d of the supporting member 61 along the whole circumference of the restricting portion 61d. A protrusion 62e is formed on an inner periphery 62c of the elastic member 62 along the whole circumference of the elastic member 62. When the protrusion 62e of the elastic member 62 engages with the recess 61g of the supporting member 61, it is possible to fixedly fit the supporting member 61 to the elastic member 62. Therefore, it is possible to easily determine the position of the elastic member 62 with respect to the supporting member 61, and it is possible to fit the supporting member 61 and the elastic member 62 to the housing 18 after the supporting member 61 and the elastic member 62 are fixedly fitted to each other. Therefore, it is possible to easily and further reliably perform assembly.

Next, a third example embodiment of the invention will be described below. In the first embodiment, as shown in FIG. 3, the restricting portion 51d of the supporting member 51 arranged radially inward of the elastic member 52 restricts axial movement. In contrast to this, in the third embodiment, as shown in FIG. 4B, a member arranged radially outward of the elastic member 52 in each elastic support mechanism 63 restricts axial movement. The elastic support mechanism 63 that is in contact with the end face 42c of the outer ring 42 of the bearing 40 will be mainly described, and the description on the elastic support mechanism 63 that has the same shape as the above-mentioned elastic support mechanism 63 and that is in contact with the end face 42b is omitted.

Specifically, in a supporting member 64, a first restricting portion 64d and a second restricting portion 64h, which is located radially outward of the first restricting portion 64d, are formed integrally with a retained portion 64c. The restricting portions 64d, 64h are formed along the whole circumference of the supporting member 64.

The first restricting portion 64d, as well as the restricting portion 51d according to the first embodiment, restricts radially inward movement of the elastic member 52.

A clearance 65 is formed between an end face 64m of the second restricting portion 64h and the first inner end face 18e. A clearance 66 is formed between an end face 64f of the first restricting portion 64d and the second inner end face 18f. A distance d4 between the end face 64m of the second restricting portion 64h and the first inner end face 18e is set shorter than a distance d3 between the end face 64f of the first restricting portion 64d and the second inner end face 18f. Therefore, in the supporting member 64, the second restricting portion 64h restricts axial movement of the elastic member 52.

A relief portion 64j, which is a recess, is formed in the first restricting portion 64d so as to face the elastic member 52, and a relief portion 64k, which is a recess, is formed in the second restricting portion 64h so as to face the elastic member 52. These relief portions 64j, 64k are formed at positions closer to the outer ring 42 of the bearing 40 than to the inner end face 18c of the housing 18. Therefore, when the elastic member 52 is compressed in the axial direction, the elastic member 52 deforms so as to escape into the clearances 67, 68.

Thus, it is possible to smoothly cause the elastic member 52 to escape into the radially inward relief portion 64j and the radially outward relief portion 64k. By causing the elastic member 52 to easily escape toward the bearing 40, the elastic member 52 is less likely to escape toward the inner end face 18c of the housing 18. Therefore, it is possible to prevent the elastic member 52 from being caught between the inner end face 18c of the housing 18 and the end face 64m of the second restricting portion 64h.

The above-described embodiments may be modified into the following alternative embodiments.

In the first embodiment, the restricting portion 51d of each supporting member 51 is formed along the whole circumference of the supporting member 51. However, the configuration of the restricting portion 51d is not limited to this. For example, the restricting portion 51d may be formed along part of the circumference of the supporting member 51 instead of being formed along the whole circumference of the supporting member 51. The restricting portion 51d may be continuously formed along only part of the circumference of the supporting member 51 or may be formed at predetermined intervals along the circumference of the supporting member 51.

In the second embodiment, a protrusion may be formed on each supporting member 61, and a recess may be formed in each elastic member 62. Engagement portions that engage with each other may be formed in a retained portion 61c of each supporting member 61 and one end face 62a of the corresponding elastic member 62. The protrusion and recess may be formed along part of the circumference of the supporting member 61 and the elastic member 62 instead of being formed along the whole circumference of the support member 61 and the elastic member 62. The protrusion and recess may be continuously formed along only part of the circumference of the supporting member 61 and the elastic member 62, or may be formed at predetermined intervals along the circumference of the supporting member 61 and the elastic member 62

In the third embodiment, at least one of the first restricting portion 64d, the second restricting portion 64h, and the relief portions 64i, 64k may be formed along part of the circumference of the supporting member 64 instead of being formed along the whole circumference of the support member 64. At least one of the first restricting portion 64d, the second restricting portion 64h, and the relief portions 64i, 64k may be continuously formed along only part of the circumference of the supporting member 64 or may be formed at predetermined intervals along the circumference of the supporting member 64.

In the above-described embodiments, the retained portion 51c of each supporting member 51 is formed along the whole circumference of the supporting member 51. However, the configuration of the retained portion 51c is not limited to this. For example, the retained portion 51c may be formed along part of the circumference of the supporting member 51 instead of being formed along the whole circumference of the supporting member 51. The retained portion 51c may be continuously formed along only part of the circumference of the supporting member 51 or may be formed at predetermined intervals along the circumference of the supporting member 51. Further, there is no problem even if the supporting member 51 itself is not annular.

In the above-described embodiments, each supporting member 51 and the corresponding elastic member 52 are not bonded to each other by an adhesive agent, or the like. However, there is no problem even if each supporting member 51 and the corresponding elastic member 52 are bonded to each other by an adhesive agent, or the like. If an adhesive agent is used as described above, adhesion between each supporting member and the corresponding elastic member will be lost over time. However, with the configuration described in the above-described embodiments, it is possible to prevent each elastic member from falling off even if adhesion is lost.

In the above-described embodiments, the thread groove 31a is formed in the entire inner periphery of the ball screw nut 31. However, the configuration of the thread groove 31a is not limited to this. For example, a thread groove may be formed in part of the region of the inner periphery of the ball screw nut 31. In the above-described embodiments, the thread groove 12a is formed in part of the outer periphery of the rack shaft 12. However, the configuration of the thread groove 12a is not limited to this. For example, a thread groove may be formed in the entire outer periphery of the rack shaft 12.

In the above-described embodiments, the belt 23 that is looped over the pulleys 22, 24 is provided in the speed reduction mechanism 20. However, the configuration of the speed reduction mechanism 20 is not limited to this. No belt may be provided. In this case, an intermediate pulley may be provided instead of the belt 23.

Figure 5:
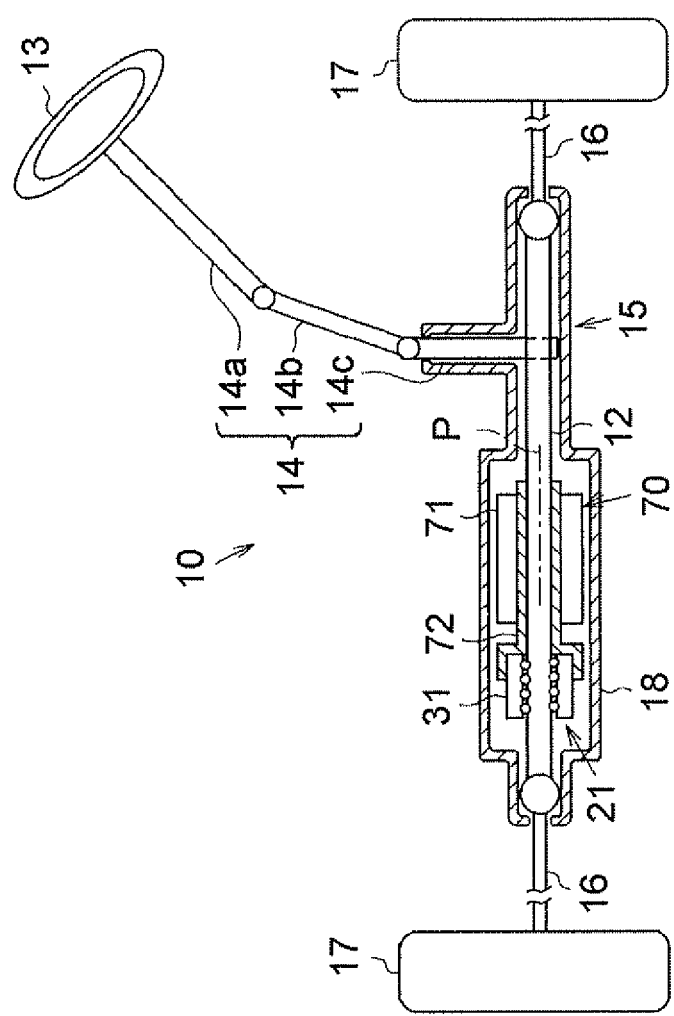
FIG. 5 is a schematic view that illustrates an electric power steering system according to fourth and sixth embodiments of the invention.

In the above-described embodiments, the invention may be applied to a rack coaxial-type electric power steering system. Specifically, in the rack coaxial-type electric power steering system, as shown in FIG. 5, a motor shaft (rotor) 26 that rotates as a motor 70 (stator 27) is driven is arranged, and a rotation axis of the motor shaft 26 coincides with the rotation axis P of the rack shaft 12. The motor shaft 26 is screwed to the outer periphery of the ball screw nut 31. Thus, the rotation of the motor 70 is transmitted to the ball screw nut 31 via the motor shaft 26. In this case, the ball screw nut 31 and the motor shaft 26 may function as a cylindrical member. The ball screw nut 31 may be directly slidably supported by a bearing, or the motor shaft 72 may be directly slidably supported by a bearing.

In the above-described embodiments, the elastic member 52 is arranged between the inner end face 18c of the housing 18 and the end face 42c of the outer ring 42 of the bearing 40. However, the position of the elastic member 52 is not limited to this. For example, the elastic member 52 may be arranged between the end face 42c of the outer ring 42 of the bearing 40 and a member fixedly attached to the housing 18 instead of the housing 40 itself. That is, a member for retaining the elastic member on the end face of the outer ring of the bearing or a member, such as a center nut, in the rack coaxial-type electric power steering system may be included in the housing described in the appended claims.

In the above-described embodiments, the bearing 40 may be a roller bearing in which rollers are used as rolling elements.

Hereinafter, a fourth example embodiment of the invention will be described with reference to FIG. 5 to FIG. 8 and FIGS. 8A and 8B. As shown in FIG. 5, the electric power steering system 10 that serves as a steering system for a vehicle is a rack coaxial-type system in which the motor 70 is installed such that the rotation axis P of the motor shaft 26 that rotates as the motor 70 is driven coincides with the rotation axis P of the rack shaft 12 that serves as an output member. The electric power steering system 10 includes the steering shaft 14 to which the steering wheel 13 is fixed. The steering shaft 14 is coupled to the rack shaft 12 via the rack-and-pinion mechanism 15. The rotation of the steering shaft 14 in response to a steering operation is converted into a reciprocating linear motion of the rack shaft 12 by the rack-and-pinion mechanism 15.

The steering shaft 14 according to the present embodiment is formed by coupling a column shaft 14a, an intermediate shaft 14b and a pinion shaft 14c to each other. The reciprocating linear motion of the rack shaft 12 in accordance with the rotation of the steering shaft 14 is transmitted to knuckles (not shown) via tie rods 16 coupled to respective ends of the rack shaft 12. As a result, the steered angle of steered wheels 17, that is, the travelling direction of the vehicle is changed.

The electric power steering system 10 includes the housing 18 through which the rack shaft 12 is passed. The motor 70 is fitted to the housing 18. The ball screw mechanism 21, and the like, are accommodated in the housing 18. The ball screw mechanism 21 serve as a conversion mechanism that transmits driving force from the motor 70 to the rack shaft 12. The motor 70 is arranged inside the housing 18. The motor shaft 26 is screwed at one end portion to the ball screw mechanism 21. The motor shaft 26 rotates together with the ball screw mechanism 21 by the received rotation.

The motor 70 is driven in response to movement of the rack shaft 12. That is, the motor 70 is driven in response to the rotation of the steering shaft 14. Therefore, the motor 70 is not driven immediately after an operation of the steering wheel 13 is started. For example, when a steered angle is small during high-speed travelling, the motor 70 is not driven.

Figure 6:
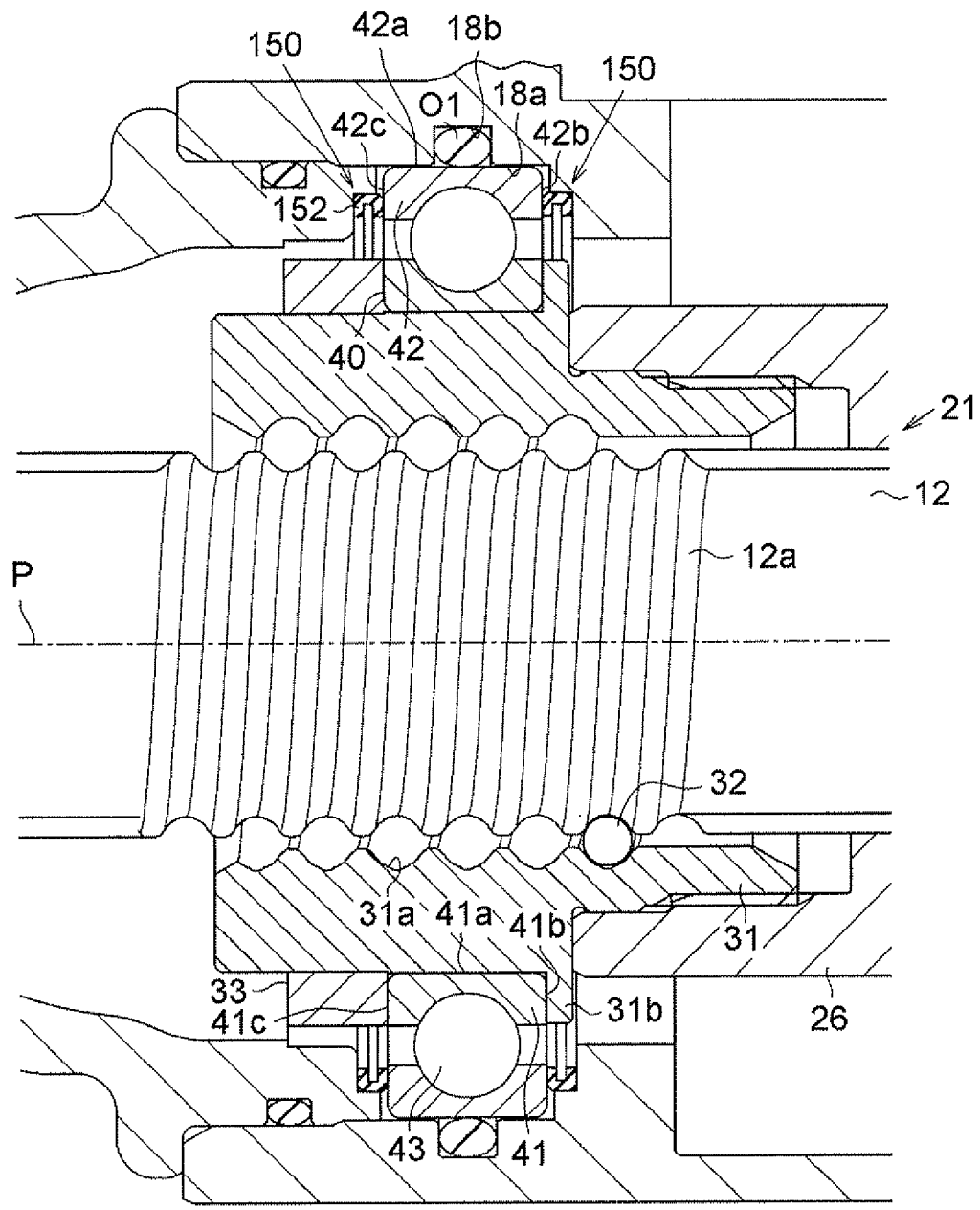
FIG. 6 is a sectional view that shows a ball screw mechanism according to the fourth embodiment.

The ball screw mechanism 21 according to the present embodiment will be described below with reference to FIG. 6. As shown in FIG. 6, the ball screw mechanism 21 includes the sleeve-shaped ball screw nut 31 and a plurality of the balls 32. The ball screw nut 31 is configured to be rotatable together with the motor shaft 26. The balls 32 are arranged between the ball screw nut 31 and the rack shaft 12 in a radial direction about the rotation axis P (only one ball 32 is shown in FIG. 6).

Note that, in the present embodiment, a direction along the rotation axis P is simply referred to as "axial direction".

The thread groove 31a is formed in the inner periphery of the ball screw nut 31. The thread groove 12a is formed in the outer periphery of the rack shaft 12. The balls 32 are arranged in the rolling passage that is formed between the thread groove 12a formed in the outer periphery of the rack shaft 12 and the thread groove 31a formed in the inner periphery of the ball screw nut 31.

In this way, the ball screw mechanism 21 is formed by screwing the rack shaft 12 to the ball screw nut 31 via the balls 32 placed in the ball screw nut 31. That is, the rack shaft 12 is coaxially passed through the ball screw nut 31, and the rotation of the ball screw nut 31 is transmitted to the rack shaft 12 as assist force via the balls 32.

In the present embodiment, the motor shaft 26 and the ball screw nut 31 may function as a cylindrical member. In the present embodiment, a portion in which the thread groove 31a, which may function as a first thread groove, is formed may function as a first thread portion, and a portion in which the thread groove 12a, which may function as a second thread groove, is formed may function as a second thread portion.

The ball screw nut 31 is rotatably supported by the housing 18 via the bearing 40. The bearing 40 is a ball bearing that includes the inner ring 41, the outer ring 42 and the spherical rolling elements 43 that are interposed between the inner ring 41 and the outer ring 42.

The inner periphery 41a of the inner ring 41 of the bearing 40 is in contact with the ball screw nut 31. One axial end face 41b of the inner ring 41 of the bearing 40 is in contact with a step portion 31b formed in the ball screw nut 31, and the other axial end face 41c is in contact with the nut 33. The nut 33 is screwed to the outer periphery of the ball screw nut 31. In this way, the ball screw nut 31 is rotatably supported by the inner periphery 41a of the inner ring 41 of the bearing 40.

The outer periphery 42a of the outer ring 42 of the bearing 40 is in contact with the inner periphery 18a of the housing 18. In the present embodiment, the groove portion 18b is formed in the inner periphery 18a of the housing 18 so as to face the outer periphery 42a of the outer ring 42, and the O ring O1 is arranged in the groove portion 18b. In this way, the O ring O1 is retained between the groove portion 18b of the housing 18 and the outer periphery 42a of the outer ring 42.

The axial end faces 42b, 42c of the outer ring 42 of the bearing 40 are in contact with respective elastic support mechanisms 150. Each elastic support mechanism 150 is formed of an annular elastic member 152 made of rubber, and elastically supports the outer ring 42 of the bearing 40 such that the outer ring 42 is able to be displaced in the axial direction. The elastic support mechanisms 150 support the ball screw nut 31 and the motor shaft 26 via the bearing 40 such that the ball screw nut 31 and the motor shaft 26 are able to be displaced in the axial direction.

Figure 7:
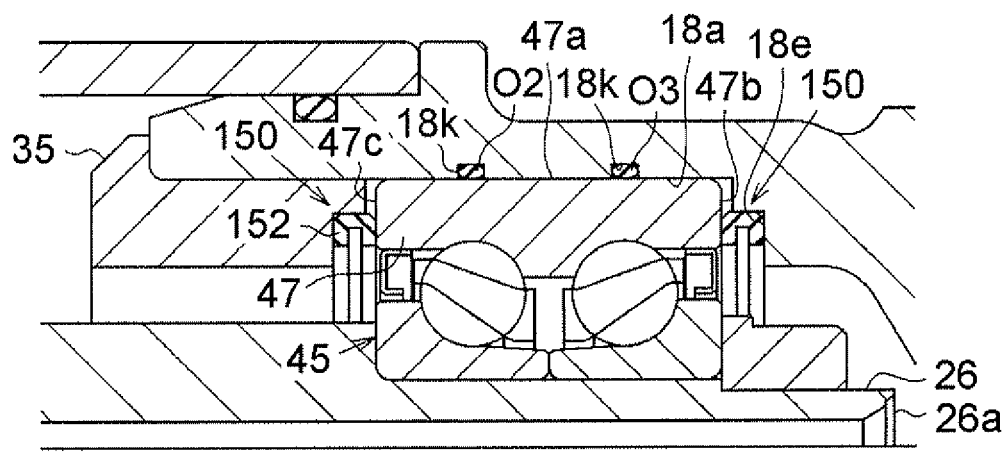
FIG. 7 is a sectional view that shows elastic support mechanisms according to the fourth embodiment.
Figure 7:
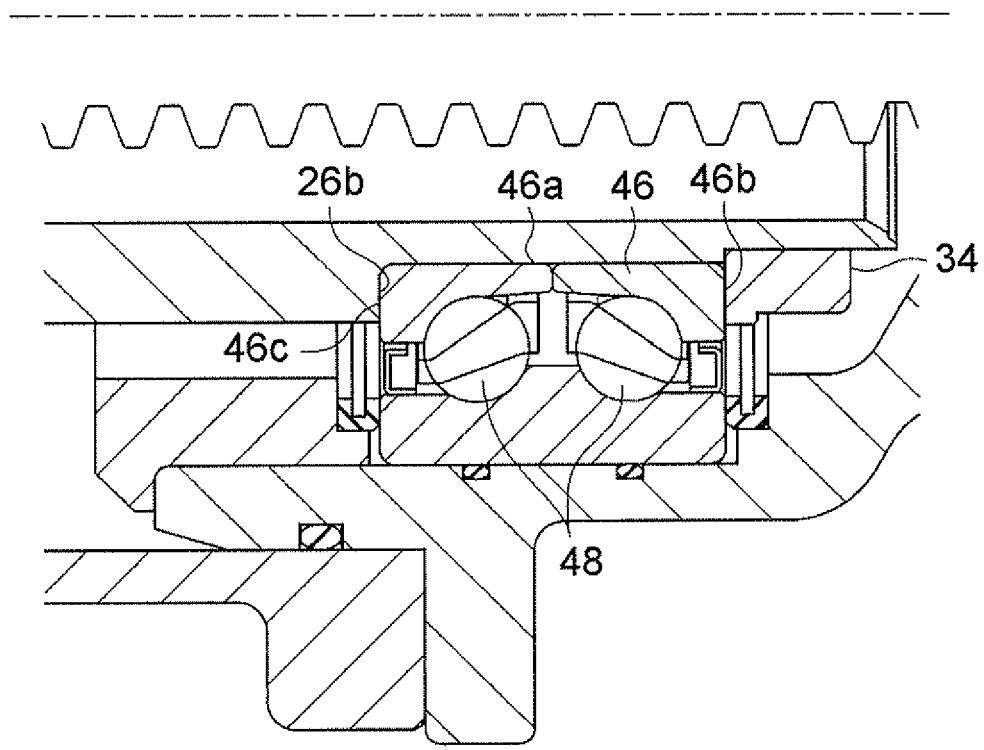

The motor shaft 26 according to the present embodiment will be described below with reference to FIG. 7. As shown in FIG. 7, the motor shaft 26 is rotatably supported by the housing 18 via a bearing 45, at a position near an open end 26a which is on the opposite side from a portion at which the motor shaft 26 is screwed to the ball screw nut 31 (see FIG. 6). The bearing 45 is a double row ball bearing that includes an inner ring 46, an outer ring 47 and spherical rolling elements 48 that are interposed between the inner ring 46 and the outer ring 47.

An inner periphery 46a of the inner ring 46 of the bearing 45 is in contact with the motor shaft 26. One axial end face 46b of the inner ring 46 of the bearing 45 is in contact with a nut 34, and the other axial end face 46c is in contact with a step portion 26*b* that is formed in the motor shaft 26. The nut 34 is screwed to the outer periphery of the motor shaft 26. In this way, the motor shaft 26 is rotatably supported by the inner periphery 46*a* of the inner ring 46 of the bearing 45.

An outer periphery 47*a* of the outer ring 47 of the bearing 45 is in contact with the inner periphery 18*a* of the housing 18. In the present embodiment, groove portions 18*k* are formed in the inner periphery 18*a* of the housing 18 so as to face the outer periphery 47*a* of the outer ring 47, and O rings O2, O3 are arranged in the respective groove portions 18*k*. In this way, the O rings O2, O3 are retained between the groove portions 18*k* of the housing 18 and the outer periphery 47*a* of the outer ring 47.

Axial end faces 47*b*, 47*c* of the outer ring 47 of the bearing 45 are in contact with the respective elastic support mechanisms 150. One of the elastic support mechanisms 150 is retained between the end face 47*b* of the outer ring 47 of the bearing 45 and the inner end face 18*e* of the housing 18, and the other elastic support mechanism 150 is retained between the end face 47*c* of the outer ring 47 of the bearing 45 and a center nut 35 screwed to the inner face of the housing 18. Because each elastic support mechanism 150 has the same configuration as the mechanism that elastically supports the bearing 40, the description thereof is omitted. The outer ring 47 of the bearing 45 is provided together with the inner ring 46 of the bearing 45 via the rolling elements 48, and the inner ring 46 of the bearing 45 is fixedly fitted to the motor shaft 26. That is, the elastic support mechanisms 150 support the motor shaft 26 via the bearing 45 such that the motor shaft 26 is able to be displaced in the axial direction.

The elastic support mechanisms 150 according to the present embodiment will be described below with reference to FIG. 8A and FIG. 8B. The elastic support mechanism 150 that is in contact with the end face 47*b* of the outer ring 47 of the bearing 45 has the same shape as the elastic support mechanism 150 that is in contact with the end face 47*c*, and the elastic support mechanisms 150 at the outer ring 42 of the bearing 40 also have the same configuration. Therefore, the elastic support mechanism 150 that is in contact with the end face 47*b* of the outer ring 47 of the bearing 45 will be mainly described, and the description on the elastic support mechanism 150 that is in contact with the end face 47*c* and the elastic support mechanisms 150 at the outer ring 42 of the bearing 40 is omitted.

Figure 8A:
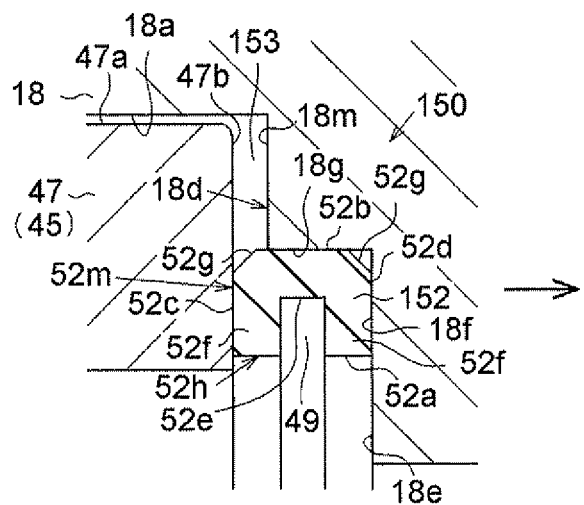
FIG. 8A and FIG. 8B are sectional views that show one of the elastic support mechanisms according to the fourth embodiment.

As shown in FIG. 8A, the annular step portion 18*d* is formed in the inner end face 18*e* of the housing 18. The step portion 18*d* is formed along the whole circumference of the housing 18 so as to face the end face 47*b* of the outer ring 47 of the bearing 45. The inner end face 18*e* is formed of a first inner end face 18*f* and a second inner end face 18*m*.

In the step portion 18*d*, the second inner end face 18*m* is parallel to the first inner end face 18*f*, and is formed at a position radially outward of the first inner end face 18*f* and closer to the outer ring 47 of the bearing 45 than the first inner end face 18*f*. The inner periphery 18*g* of the step portion 18*d* is in contact with the outer periphery 52*b* of the elastic member 152.

In a state where one end face 52*c* of an elastic member 152 is in contact with the end face 47*b* of the outer ring 47 of the bearing 45 and the other end face 52*d* of the elastic member 152 is in contact with the first inner end face 18*f*, a clearance 153 is formed between the second inner end face 18*m* and the end face 47*b* of the outer ring 47 of the bearing 45.

The elastic member 152 of the elastic support mechanism 150 is a member having elasticity, and is a member that allows the outer ring 47 of the bearing 45 to be displaced in the axial direction. The outside diameter of the elastic member 152 is slightly smaller than the inside diameter of the inner periphery 18*g* of the step portion 18*d* of the housing 18, and the elastic member 152 is arranged so as to face the end face 47*b* of the outer ring 47 of the bearing 45 along the whole circumference of the end face 47*b*.

Figure 8B:
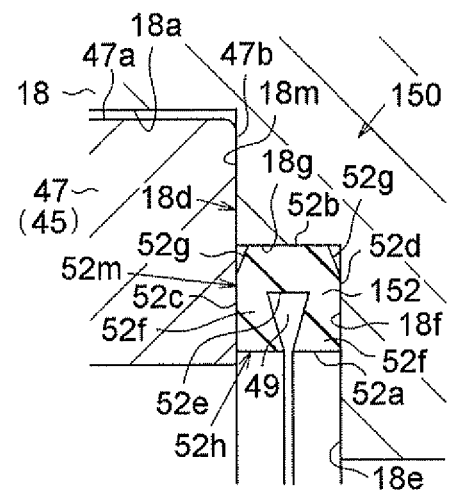

In addition, as shown in FIG. 8B, the outer ring 47 of the bearing 45 is movable in the axial direction toward the first inner end face 18*f* until the end face 47*b* contacts the second inner end face 18*m*. In other words, the end face 47*b* of the outer ring 47 of the bearing 45 restricts axial movement of the bearing 45 and the motor shaft 26 by contacting the second inner end face 18*m*.

As shown in FIG. 8A, an annular recess 52*e* is formed in an inner periphery 52*a* of the elastic member 152, and a clearance 49 is formed. The recess 52*e* is a groove having a rectangular shape in radial section, and is formed in the inner periphery 52*a* of the elastic member 152 along the whole circumference of the inner periphery 52*a*. The recess 52*e* is formed so that, when the elastic member 152 is compressed in the axial direction, the elastic member 152 is less likely to deform radially inward and the elastic member 152 is allowed to deform by causing leg portions 52*f* of the elastic member 152 to escape into the clearance 49.

Meanwhile, chamfered portions 52*g* are formed in the outer periphery 52*b* of the elastic member 152. The chamfered portions 52*g* have an annular shape and are formed at respective end portions of the outer periphery 52*b*, and are formed along the whole circumference of the outer periphery 52*b* of the elastic member 152. The chamfered portions 52*g* are formed so that the leg portions 52*f* of the elastic member 152 are allowed to easily escape into the clearance 49 when the elastic member 152 is compressed in the axial direction.

In the elastic member 152, the width of the recess 52*e* is greater than the width of the chamfered portions 52*g*. That is, in the elastic member 152, an inner peripheral portion 52*h* close to the inner periphery 52*a* (inner peripheral edge) is thinner and lower in stiffness than an outer peripheral portion 52*m* close to the outer periphery 52*b* (outer peripheral edge). In the present embodiment, the elastic member 152 is not bonded to the housing 18 or the outer ring 47 of the bearing 45 by an adhesive agent.

The operation of the above-configured electric power steering system 10 will be described below. In the electric power steering system 10, the motor shaft 26 of the motor 70 is screwed to the ball screw nut 31. The ball screw nut 31 is supported with respect to the housing 18 by the inner periphery 41*a* of the inner ring 41 of the bearing 40.

The one end face 41*b* of the inner ring 41 of the bearing 40 is in contact with the step portion 31*b* formed on the ball screw nut 31, and the other end face 41*c* is in contact with the nut 33. Thus, the inner ring 41 of the bearing 40 is arranged so as to be rotatable together with the ball screw nut 31 and the motor shaft 26. The outer periphery 42*a* of the outer ring 42 of the bearing 40 is in contact with the inner periphery 18*a* of the housing 18, and the end faces 42*b*, 42*c* of the outer ring 42 of the bearing 40 are elastically supported by the respective elastic support mechanisms 150.

In addition, the motor shaft 26 is supported with respect to the housing 18 by the inner periphery 46*a* of the inner ring 46 of the bearing 45. The one end face 46*b* of the inner ring 46 of the bearing 45 is in contact with the nut 34, and the other end face 41*c* is in contact with the step portion 26*b* formed on the motor shaft 26. Thus, the inner ring 46 of the bearing 45 is arranged so as to be rotatable together with the motor shaft 26. The outer periphery 47*a* of the outer ring 47 of the bearing 45 is in contact with the inner periphery 18*a* of the housing 18, and the end faces 47b, 47c of the outer ring 47 of the bearing 45 are elastically supported by the respective elastic support mechanisms 150.

The elastic support mechanism 150 that elastically supports the end face 47h of the outer ring 47 of the bearing 45 will be described as a representative example. The one end face 52c of the elastic member 152 of the elastic support mechanism 150 is in contact with the end face 47b of the outer ring 47 of the bearing 45, and the other end face 52d is in contact with the first inner end face 18f. The end face 47b of the outer ring 47 of the bearing 45 does not contact the second inner end face 18m, and the outer ring 47 of the bearing 45 is elastically supported by the elastic member 152 in the axial direction.

When the steering wheel 13 is operated by the driver, the rotational motion of the steering wheel 13 is transmitted to the rack-and-pinion mechanism 15 via the steering shaft 14, and a reciprocating linear motion of the rack shaft 12 is performed.

In this way, at so-called turning start timing at which the operation of the steering wheel 13 is just started, the motor 70 has not been driven yet. Therefore, in a state where no assist force is applied to the rack shaft 12, the rack shaft 12 makes a reciprocating linear motion through driver's operation of the steering wheel 13.

When the reciprocating linear motion of the rack shaft 12 is performed, friction is generated between the rack shaft 12 and the balls 32 arranged in the thread groove 12a which is formed in the outer periphery of the rack shaft 12. Accordingly, friction is generated between the balls 32 and the ball screw nut 31, between the ball screw nut 31 and the bearing 40, and between the bearing 40 and the elastic support mechanisms 150. In addition, friction is also generated between the ball screw nut 31 and the motor shaft 26, between the motor shaft 26 and the bearing 45, and between the bearing 45 and the elastic support mechanisms 150.

The elastic support mechanism 150 that elastically supports the end face 47b of the outer ring 47 of the bearing 45 will be described as a representative example. The force in the axial direction in which the rack shaft 12 makes a reciprocating linear motion is transmitted from the end face 47b of the outer ring 47 of the bearing 45 to the elastic member 152 of the elastic support mechanism 150. The elastic member 152 that is in contact with the first inner end face 18f is compressed in the axial direction and is deformed, and the outer ring 47 of the bearing 45 moves in the axial direction.

When the outer ring 47 of the bearing 45 moves in the axial direction in this way, mainly, the inner ring 46 of the bearing 45 and the motor shaft 26 move in the axial direction in which the rack shaft 12 makes a reciprocating linear motion. Therefore, at the start timing of turning the steering wheel 13, it is possible to improve the driver's steering feel and suppress tooth noise by reducing friction force based on the reciprocating linear motion of the rack shaft 12.

Even when the elastic member 152 is compressed in the axial direction, the elastic member 152 is prevented from slipping off radially inward because the recess 52e is formed in the inner periphery 52a of the elastic member 152 and the inner peripheral portion 52h is lower in stiffness than the outer peripheral portion 52m. Furthermore, due to the formation of the recess 52e, even when the elastic member 152 is compressed in the axial direction, the elastic member 152 is allowed to easily deform by causing the leg portions 52f of the elastic member 152 to escape into, for example, the clearance 49 formed in the recess 52e. In addition, the chamfered portions 52g are formed at the end portions of the outer periphery 52b of the elastic member 152. Therefore, the leg portions 52f of the elastic member 152 easily escape into, for example, the clearance 49 in the recess 52e, and the elastic member 152 easily deforms.

The end face 47b of the outer ring 47 of the bearing 45 does not contact the second inner end face 18m when the elastic member 152 is not compressed with the predetermined load in the axial direction; whereas the end face 47b contacts the second inner end face 18m when the elastic member 152 is compressed with the predetermined load in the axial direction. Therefore, the outer ring 47 of the bearing 45 restricts axial movement of the bearing 45, the motor shaft 26, and the like. This prevents a large load from acting on the elastic member 152.

In this way, when the reciprocating linear motion of the rack shaft 12 is started, the motor shaft 26 is driven by the motor 70 to rotate in such a direction that the reciprocating linear motion of the rack shaft 12 is assisted. As the motor shaft 26 rotates, the ball screw nut 31 rotates, and assist force is supplied to the reciprocating linear motion of the rack shaft 12 via the balls 32.

As described in detail above, the present embodiment has the following advantageous effects.

(1) The elastic members 152 elastically support the ball screw nut 31 and the motor shaft 26 (cylindrical member) that rotate coaxially with the rack shaft 12 such that the ball screw nut 31 and the motor shaft 26 are movable in the axial direction (direction along the rotation axis P) via the bearings 40, 45. In addition, each elastic member 152 is formed such that the inner peripheral portion 52h is thinner than the outer peripheral portion 52m. In this way, the stiffness is varied in each elastic member 152 by making the stiffness of the inner peripheral portion 52h of the elastic member 152 lower than that of the outer peripheral portion 52m. As a result, each elastic member 152 is less likely to move radially inward. In addition, by appropriately arranging each elastic member 152, it is possible to suppress deterioration of the driver's steering feel.

(2) The recess 52e is formed in the inner periphery 52a of each elastic member 152. Therefore, it is possible to allow each elastic member 152 to smoothly deform by causing the leg portions 52f of the elastic member 52 to smoothly escape into the clearance 49 in the recess 52e.

(3) The chamfered portions 52g are formed at respective end portions of the outer periphery 52b of each elastic member 152. Therefore, it is possible to allow each elastic member 152 to easily deform by causing the leg portions 52f of the elastic member 152 to escape into the clearance 49 in the recess 52e.

(4) Each elastic member 152 is formed such that the inner peripheral portion 52h is thinner than the outer peripheral portion 52m. In this way, each elastic member 152 is configured so as not to slip off radially inward without bonding the elastic member 152 to the outer ring 47 of the bearing 45 or the first inner end face 18f by an adhesive agent. Therefore, it is possible to prevent curing of the elastic member due to an adhesive agent. In addition, because it is possible to omit bonding process, it is possible to reduce the number of processes at the time of assembly.

Next, a fifth example embodiment of the invention will be described below. In the following description, the same components as those in the above-described fourth embodiment will be denoted by the same reference numerals in the fourth embodiment, and the description thereof will be omitted or simplified.

In the fourth embodiment, by forming the recess 52e in the inner periphery 52a of each elastic member 152, the inner peripheral portion 52h of the elastic member 152 is formed to be thinner than the outer peripheral portion 52m of the elastic member 152. In contrast to this, in the fifth embodiment, as shown in FIG. 9A and FIG. 9B, by forming a bulge portion 54e at an inner periphery 54a of an elastic member 154 in each elastic support mechanism 160, an inner peripheral portion 54h of the elastic member 154 is formed so as to be thinner than an outer peripheral portion 54m of the elastic member 154.

Figure 9A:
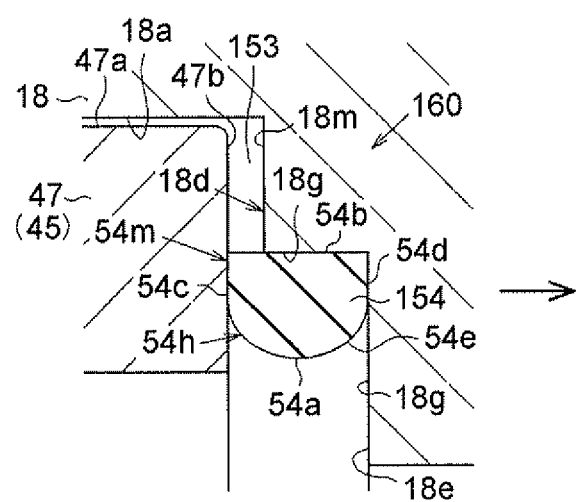
FIG. 9A and FIG. 9B are sectional views that show one of elastic support mechanisms according to a fifth embodiment of the invention.
Figure 9B:
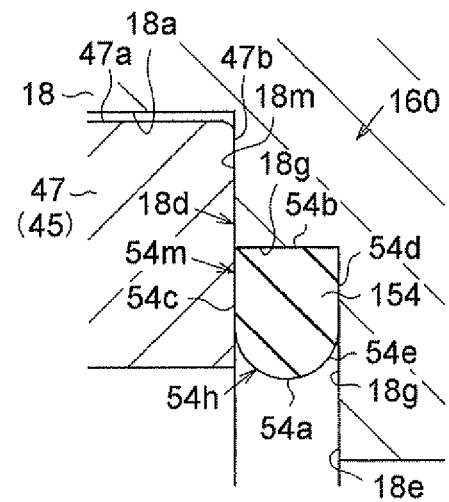

Specifically, as shown in FIG. 9A, the bulge portion 54e is formed at the inner periphery 54a of each elastic member 154. The bulge portion 54e has a circular arc shape in radial section. In addition, no irregularity is formed at an outer periphery 54b of each elastic member 154. Therefore, each elastic member 154 is configured such that the inner peripheral portion 54h is lower in stiffness than the outer peripheral portion 54m. When the elastic member 154 is compressed in the axial direction, the elastic member 154 deforms as shown in FIG. 9B, and the elastic member 154 is prevented from slipping off radially inward.

The above-described embodiments may be modified into the following alternative embodiments.

Figure 10A:
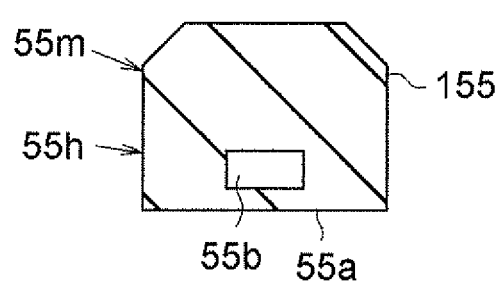
FIG. 10A and FIG. 10B are schematic views that respectively illustrate elastic members according to alternative embodiments.

In the fourth embodiment, the recess 52e is formed in the inner periphery 52a in order to reduce the thickness of the inner peripheral portion 52h of each elastic member 152. However, the configuration for reducing the thickness of the inner peripheral portion is not limited to this. For example, as shown in FIG. 10A, an elastic member 155 may be used. In the elastic member 155, no recess is formed at an inner periphery 55a, a hollow portion 55b is formed in an inner peripheral portion 55h, and the inner peripheral portion 55h is formed so as to be thinner than an outer peripheral portion 55m.

Figure 10B:
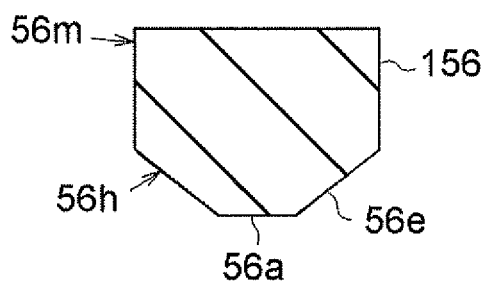

In the fifth embodiment, the bulge portion 54e having a circular arc shape in radial section is formed at the inner periphery 54a in order to reduce the thickness of the inner peripheral portion 54h of each elastic member 154. However, the configuration for reducing the thickness of the inner peripheral portion 54h is not limited to this. As shown in FIG. 10B, an elastic member 156 may be used. In the elastic member 156, a protrusion 56e having a trapezoidal shape in radial section is formed at an inner periphery 56a, and an inner peripheral portion 56h is formed so as to be thinner than an outer peripheral portion 56m.

In the above-described embodiments, the recess 52e of each elastic member 152 and the bulge portion 54e of each elastic member 154 are formed along the whole circumference of the inner periphery 52a of the elastic member 152 and the inner periphery 54a of the elastic member 154, respectively. However, the configurations of the recess 52e and the bulge portion 54e are not limited to these. For example, the recess 54e and the bulge portion 54e may be formed along part of the circumference of the inner periphery 52a of the elastic member 152 and the inner periphery 54a of the elastic member 154, respectively. The recess 54e and the bulge portion 54e may be continuously formed along only part of the circumference of the inner periphery 52a of the elastic member 152 and the inner periphery 54a of the elastic member 154, respectively, or may be formed at predetermined intervals along the circumference of the inner periphery 52a of the elastic member 152 and the inner periphery 54a of the elastic member 154, respectively.

In the above-described embodiments, axial movement is restricted by the second inner end face 18m located radially outward of the elastic member 152, 154. However, the configuration for restricting the axial movement is not limited to this. For example, axial movement may be restricted by an inner end face of the housing, which is located radially inward of the elastic member 152, 154, or may be restricted by both the second inner end face 18m and the inner end face of the housing, which is located radially inward of the elastic member 152, 154. Although not limited to this case, a member (for example, housing) that restricts radially inward movement of the elastic member 152, 154 may be arranged so as to be in contact with the radially inner side portion of the elastic member 152, 154.

In the above-described embodiments, the elastic member 152 is arranged between the inner end face 18e (first inner end face 18f) of the housing 18 and the end face 47b of the outer ring 47 of the bearing 45. However, the position of the elastic member 152 is not limited to this. For example, the elastic member 152 may be arranged between the inner end face of the center nut 35, instead of the housing 18, and the end face 47b of the outer ring 47 of the bearing 45. The center nut 35 is screwed to the inner periphery or inner end face of the housing 18, and is arranged together with the housing 18. That is, a member, such as the center nut, may be included in the housing described in the appended claims.

In the above-described embodiments, each elastic member 152 is not bonded to the housing 18 and the bearing 45 by an adhesive agent, or the like. However, there is no problem even if each elastic member 152 is bonded to the housing 18, the bearing 45, or the like, by an adhesive agent, or the like. If an adhesive agent is used as described above, adhesion between the elastic member 152, and the housing 18 and the bearing 45 will be lost over time. However, with the configuration described in the above-described embodiments, it is possible to prevent each elastic member from falling off even if adhesion is lost.

In the above-described embodiments, the thread groove 31a is formed in the entire inner periphery of the ball screw nut 31. However, the configuration of the thread groove 31a is not limited to this. For example, a thread groove may be formed in part of the region of the inner periphery of the ball screw nut 31. In the above-described embodiments, the thread groove 12a is formed in part of the outer periphery of the rack shaft 12. However, the configuration of the thread groove 12a is not limited to this. For example, a thread groove may be formed in the entire outer periphery of the rack shaft 12.

In the above-described embodiments, the invention is applied to the bearing 40 located near the ball screw nut 31 to which the motor shaft 26 is screwed and the bearing 45 located near the open end 26a of the motor shaft 26. However, the bearings to which the invention is applied are not limited to these bearings. For example, the invention is desirably applied to another bearing, such as a bearing that is located near the center portion of the motor shaft 26.

In the above-described embodiments, the ball screw nut 31 is slidably supported directly by the bearing 40. However, the configuration for supporting the ball screw nut 31 is not limited to this. For example, the motor shaft 26 may be slidably supported by a bearing and the ball screw nut 31 may be indirectly supported.

In the above-described embodiments, the invention may be applied to a rack parallel-type electric power steering system. Specifically, in the rack parallel-type electric power steering system, as shown in FIG. 1, the rotation axis P1 of the motor 11 is arranged parallel to the rotation axis P2 of the rack shaft 12. In addition, the drive pulley 22 that serves as the speed reduction mechanism 20 is fixed. The belt 23 is looped over the drive pulley 22 and the driven pulley 24 that is fixed to the ball screw nut 31. Thus, as the motor 70 is driven, rotation is transmitted from the drive pulley 22 to the ball screw nut 31 via the belt 23 and the driven pulley 24. In this case, the ball screw nut 31 and the driven pulley 24 may function as a cylindrical member. An intermediate pulley may be provided instead of the belt 23.

In the above-described embodiments, the bearing 40 may be a roller bearing in which rollers are used as rolling elements.

Hereinafter, a sixth example embodiment of the invention will be described with reference to FIG. 5 and FIG. 11 to FIG. 13. Because the electric power steering system 10 that serves as a steering system for a vehicle has the same configuration as that in the above-described fourth embodiment, the description is omitted (see FIG. 5).

Figure 11:
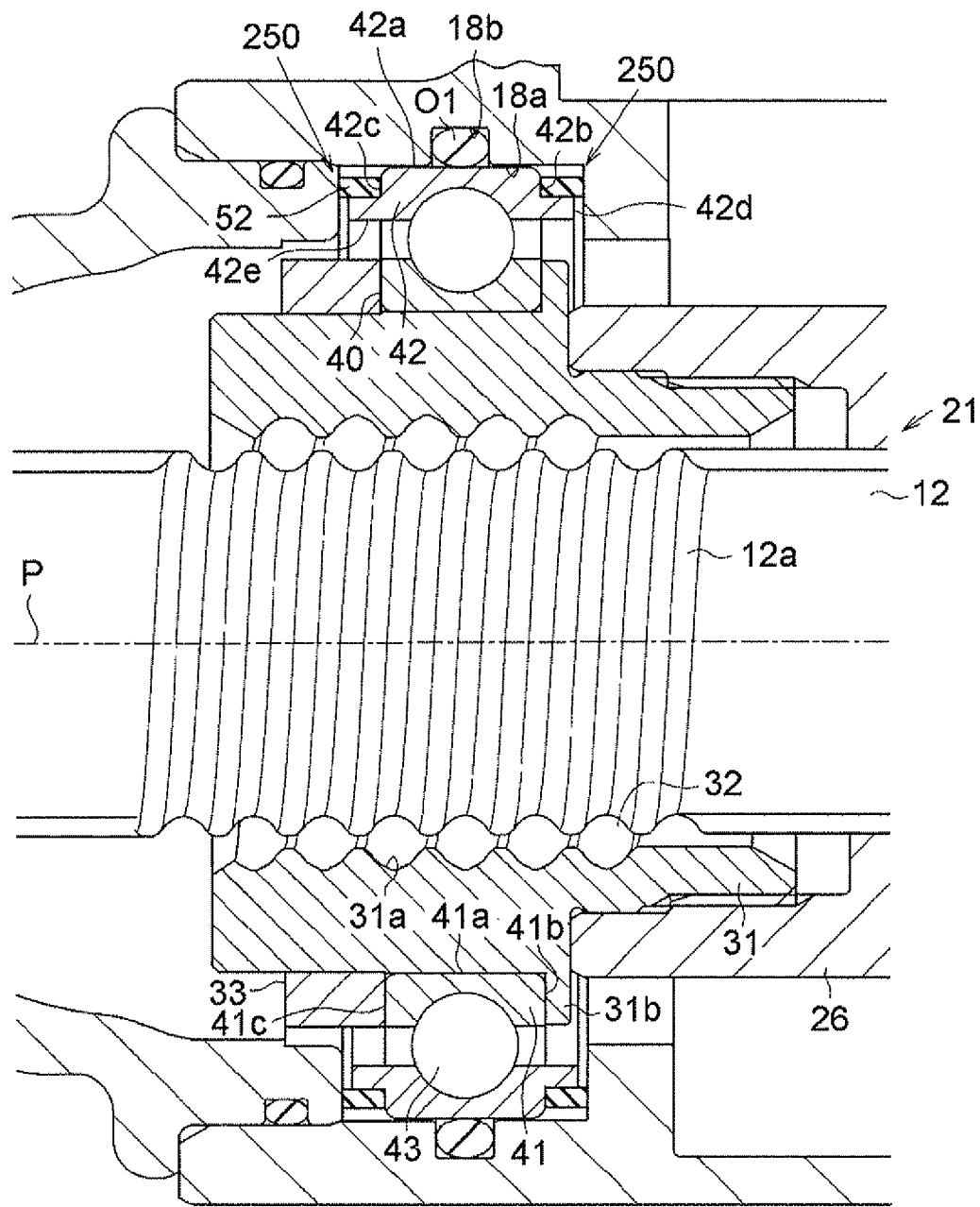
FIG. 11 is a sectional view that shows a ball screw mechanism according to the sixth embodiment.

Here, the ball screw mechanism 21 according to the present embodiment will be described below with reference to FIG. 11. As shown in FIG. 11, the ball screw mechanism 21 includes the sleeve-shaped ball screw nut 31 and the plurality of balls 32. The ball screw nut 31 is configured to be rotatable together with the motor shaft 26. The balls 32 are arranged between the ball screw nut 31 and the rack shaft 12 in a radial direction about the rotation axis P. Note that, in the present embodiment, a direction along the rotation axis P is simply referred to as "axial direction".

The thread groove 31a is formed in the inner periphery of the ball screw nut 31. The thread groove 12a is formed in the outer periphery of the rack shaft 12. The balls 32 are arranged in a rolling passage that is formed between the thread groove 12a formed in the outer periphery of the rack shaft 12 and the thread groove 31a formed in the inner periphery of the ball screw nut 31 (only one of the balls 32 is shown in FIG. 11).

In this way, the ball screw mechanism 21 is formed by screwing the rack shaft 12 to the ball screw nut 31 via the balls 32 arranged in the ball screw nut 31. That is, the rack shaft 12 is coaxially passed through the ball screw nut 31, and the rotation of the ball screw nut 31 is transmitted to the rack shaft 12 as assist force via the balls 32.

In the present embodiment, the motor shaft 26 and the ball screw nut 31 may function as a cylindrical member. In the present embodiment, a portion in which the thread groove 31a, which may function as a first thread groove, is formed may function as a first thread portion, and a portion in which the thread groove 12a, which may function as a second thread groove, is formed may function as a second thread portion.

The ball screw nut 31 is rotatably supported with respect to the housing 18 via the bearing 40. The bearing 40 is a ball bearing that includes the inner ring 41, the outer ring 42, and the spherical rolling elements 43 that are interposed between the inner ring 41 and the outer ring 42.

The inner periphery 41a of the inner ring 41 of the bearing 40 is in contact with the ball screw nut 31. The one axial end face 41b of the inner ring 41 of the bearing 40 is in contact with the step portion 31b formed in the ball screw nut 31, and the other axial end face 41c is in contact with the nut 33. The nut 33 is screwed to the outer periphery of the ball screw nut 31. In this way, the ball screw nut 31 is rotatably supported by the inner periphery 41a of the inner ring 41 of the bearing 40.

The outer periphery 42a of the outer ring 42 of the bearing 40 is in contact with the inner periphery 18a of the housing 18. In the present embodiment, the groove portion 18b is formed in the inner periphery 18a of the housing 18 so as to face the outer periphery 42a of the outer ring 42, and the O ring O1 is arranged in the groove portion 18b. In this way, the O ring O1 is retained between the groove portion 18b of the housing 18 and the outer periphery 42a of the outer ring 42.

Rib portions 42d, 42e are formed at respective axial end faces 42b, 42c of the outer ring 42 of the bearing 40. The rib portions 42d, 42e may function as restricting portions that extend in the axial direction. In the present embodiment, the rib portions 42d, 42e are formed along the whole circumference of the end faces 42b, 42c of the outer ring 42 of the bearing 40.

The axial end faces 42b, 42c of the outer ring 42 of the bearing 40 are in contact with respective elastic support mechanisms 250. Each elastic support mechanism 250 is formed of an annular elastic member 52 made of rubber, and elastically supports the outer ring 42 of the bearing 40 such that the outer ring 42 is able to be displaced in the axial direction. The elastic members 52 are arranged radially outward of the rib portions 42d, 42e of the bearing 40. The outer ring 42 of the bearing 40 is provided together with the inner ring 41 of the bearing 40 via the rolling elements 43, and the inner ring 41 of the bearing 40 is fixedly fitted to the ball screw nut 31. That is, the elastic support mechanisms 250 support the ball screw nut 31 and the motor shaft 26 via the bearing 40 such that the ball screw nut 31 and the motor shaft 26 are able to be displaced in the axial direction.

Figure 12:
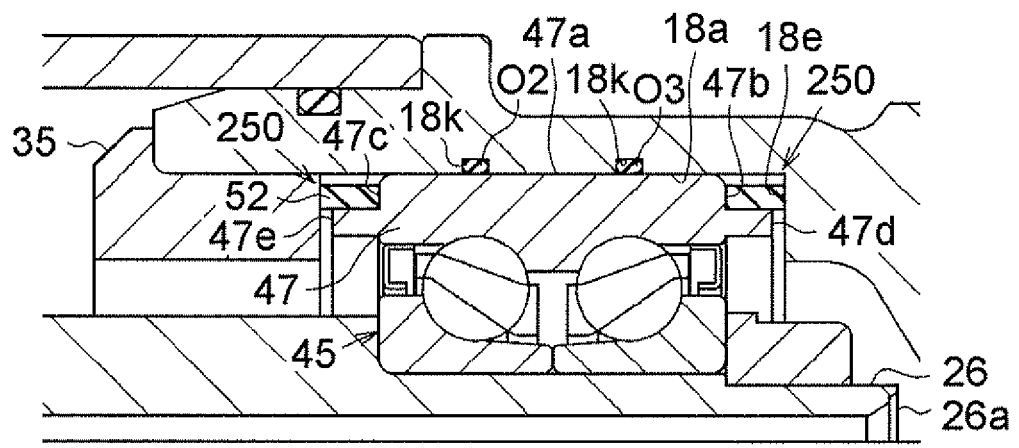
FIG. 12 is a sectional view that shows elastic support mechanisms according to the sixth embodiment.
Figure 12:
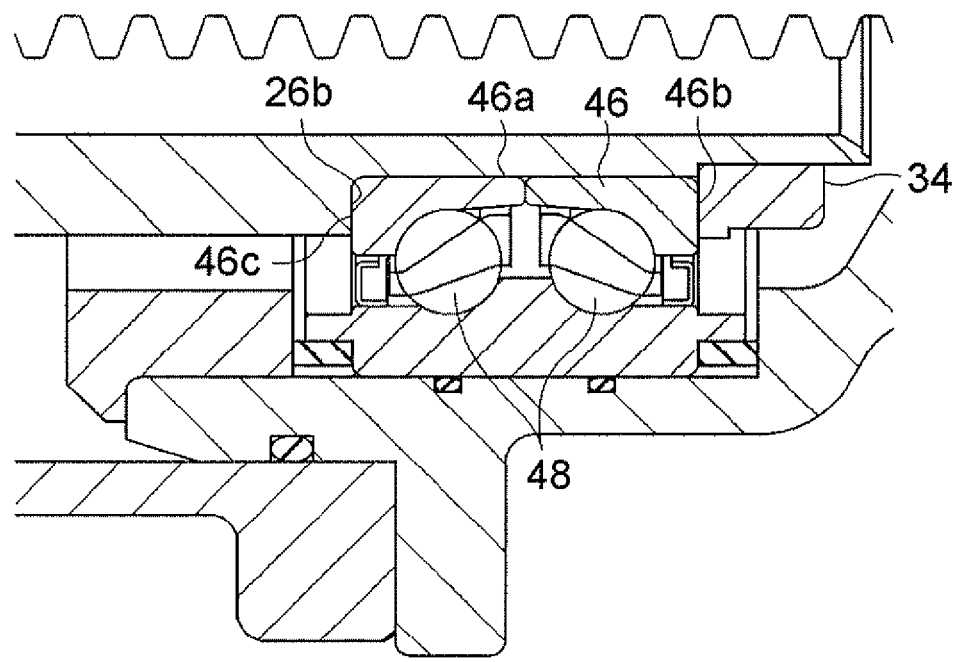

The motor shaft 26 according to the present embodiment will be described below with reference to FIG. 12. As shown in FIG. 12, the motor shaft 26 is rotatably supported with respect to the housing 18 via the bearing 45, at a position near the open end 26a that is on the opposite side from a portion at which the motor shaft 26 is screwed to the ball screw nut 31 (see FIG. 11). The bearing 45 is a double row ball bearing that includes the inner ring 46, the outer ring 47 and the spherical rolling elements 48 that are interposed between the inner ring 46 and the outer ring 47.

The inner periphery 46a of the inner ring 46 of the bearing 45 is in contact with the motor shaft 26. The one axial end face 46b of the inner ring 46 of the bearing 45 is in contact with the nut 34, and the other axial end face 46c is in contact with the step portion 26b that is formed in the motor shaft 26. The nut 34 is screwed to the outer periphery of the motor shaft 26. In this way, the motor shaft 26 is rotatably supported by the inner periphery 46a of the inner ring 46 of the bearing 45.

The outer periphery 47a of the outer ring 47 of the bearing 45 is in contact with the inner periphery 18a of the housing 18. In the present embodiment, the groove portions 18k are formed in the inner periphery 18a of the housing 18 so as to face the outer periphery 47a of the outer ring 47, and the O rings O2, O3 are arranged in the respective groove portions 18k. In this way, the O rings O2, O3 are retained between the groove portions 18k of the housing 18 and the outer periphery 47a of the outer ring 47.

Rib portions 47d, 47e are formed at the respective axial end faces 47b, 47c of the outer ring 47 of the bearing 45. The rib portions 47d, 47e extend in the axial direction. In the present embodiment, the rib portions 47d, 47e are formed integrally with the outer ring 47 of the bearing 45, and are formed along the whole circumference of the end faces 47b, 47c of the outer ring 47 of the bearing 45.

The axial end faces 47b, 47c of the outer ring 47 of the bearing 45 are in contact with the respective elastic support mechanisms 250. One of the elastic support mechanisms 250 is retained between the end face 47b of the outer ring 47 of the bearing 45 and the inner end face 18e of the housing 18, and the other elastic support mechanism 250 is retained between the end face 47c of the outer ring 47 of the bearing 45 and the center nut 35 screwed to the inner face of the housing 18. Because each elastic support mechanism 250 has the same configuration as the mechanism that elastically supports the bearing 40, the description thereof is omitted. The outer ring 47 of the bearing 45 is provided together with the inner ring 46 of the bearing 45 via the rolling elements 48, and the inner ring 46 of the bearing 45 is fixedly fitted to the motor shaft 26. That is, the elastic support mechanisms 250 support the motor shaft 26 via the bearing 45 such that the motor shaft 26 is able to be displaced in the axial direction.

The elastic support mechanisms 250 according to the present embodiment will be described below with reference to FIG. 13. The elastic support mechanism 250 that is in contact with the end face 47b of the outer ring 47 of the bearing 45 has the same shape as the elastic support mechanism 250 that is in contact with the end face 47c, and the elastic support mechanisms 250 at the outer ring 42 of the bearing 40 also have the same configuration. Therefore, the elastic support mechanism 250 that is in contact with the end face 47b of the outer ring 47 of the bearing 45 will be mainly described, and the description on the elastic support mechanism 250 that is in contact with the end face 47c and the elastic support mechanisms 250 near the outer ring 42 of the bearing 40 is omitted.

Figure 13:
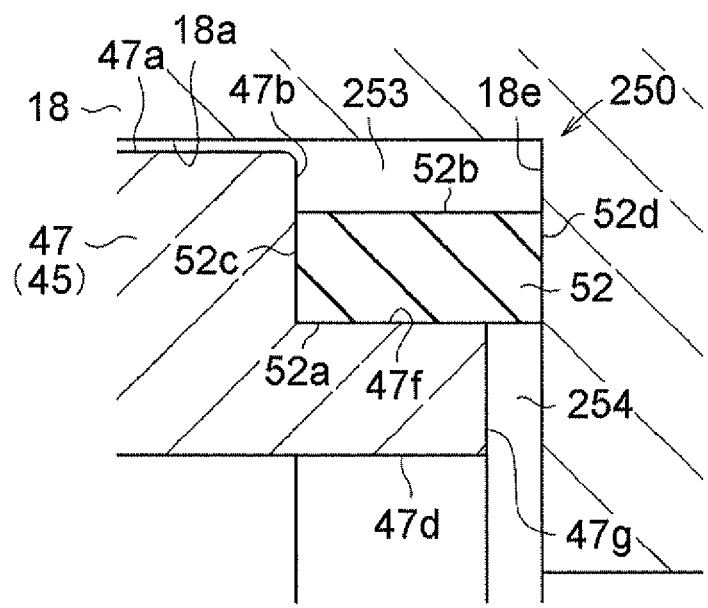
FIG. 13 is a sectional view that shows one of the elastic support mechanisms according to the sixth embodiment.

As shown in FIG. 13, the elastic member 52 of the elastic support mechanism 250 is a member having elasticity, and is a member that allows the outer ring 47 of the bearing 45 to be displaced in the axial direction. The inside diameter of the elastic member 52 is slightly larger than the outside diameter of the rib portion 47d of the outer ring 47 of the bearing 45, and the elastic member 52 is arranged along the whole circumference of the rib portion 47d. Therefore, the inner periphery 52a of the elastic member 52 is arranged so as to be in contact with the outer periphery 47f of the rib portion 47d. On the other hand, the outer periphery 52b of the elastic member 52 does not contact the inner periphery 18a of the housing 18, and a clearance 253 is formed between the outer periphery 52b and the inner periphery 18a.

One end face 52c of the elastic member 52 is in contact with the end face 47b of the outer ring 47 of the bearing 45, and the other end face 52d is in contact with the inner end face 18e of the housing 18. The elastic member 52 is retained between the end face 47b and the inner end face 18e. In addition, when the elastic member 52 is compressed in the axial direction between the end face 47b of the outer ring 47 of the bearing 45 and the inner end face 18e of the housing 18, the elastic member 52 is displaced so as to escape into the clearance 253.

An end face 47g of the rib portion 47d of the outer ring 47 of the bearing 45 does not contact the inner end face 18e of the housing 18, and a clearance 254 is formed between the end face 47g and the inner end face 18e. Therefore, the outer ring 47 of the bearing 45 is able to be displaced in the axial direction toward the inner end face 18e of the housing 18 until the end face 47g of the rib portion 47d contacts the inner end face 18e of the housing 18. In other words, the rib portion 47d of the outer ring 47 of the bearing 45 contacts the inner end face 18e of the housing 18. In this way, axial movement of the bearing 45 and the motor shaft 26 is restricted.

In the present embodiment, the elastic member 52 is not bonded to the housing 18 or the outer ring 47 of the bearing 45 by an adhesive agent. The elastic member 52 is in contact with the rib portion 47d of the outer ring 47 of the bearing 45. Thus, the outer ring 47 of the bearing 45 and the elastic member 52 are fixedly arranged.

The operation of the above-configured electric power steering system 10 will be described below. In the electric power steering system 10, the motor shaft 26 of the motor 70 is screwed to the ball screw nut 31. The ball screw nut 31 is supported with respect to the housing 18 by the inner periphery 41a of the inner ring 41 of the bearing 40.

The one end face 41b of the inner ring 41 of the bearing 40 is in contact with the step portion 31b formed in the ball screw nut 31, and the other end face 41c is in contact with the nut 33. Thus, the inner ring 41 of the bearing 40 is arranged so as to be rotatable together with the ball screw nut 31 and the motor shaft 26. The outer periphery 42a of the outer ring 42 of the bearing 40 is in contact with the inner periphery 18a of the housing 18, and the end faces 42b, 42c of the outer ring 42 of the bearing 40 are elastically supported by the respective elastic support mechanisms 250.

In addition, the motor shaft 26 is supported with respect to the housing 18 by the inner periphery 46a of the inner ring 46 of the bearing 45. The one end face 46b of the inner ring 46 of the bearing 45 is in contact with the nut 34, and the other end face 41c is in contact with the step portion 26b formed in the motor shaft 26. Thus, the inner ring 46 of the bearing 45 is arranged so as to be rotatable together with the motor shaft 26. The outer periphery 47a of the outer ring 47 of the bearing 45 is in contact with the inner periphery 18a of the housing 18, and the end faces 47b, 47c of the outer ring 47 of the bearing 45 are elastically supported by the respective elastic support mechanisms 250.

The elastic support mechanism 250 that elastically supports the end face 47b of the outer ring 47 of the bearing 45 will be described as a representative example. The inner periphery 52a of the elastic member 52 of the elastic support mechanism 250 is in contact with the outer periphery 47f of the rib portion 47d. In addition, the one end face 52c of the elastic member 52 is in contact with the end face 47b of the outer ring 47 of the bearing 45, and the other end face 52d is in contact with the inner end face 18e of the housing 18. The end face 47g of the rib portion 47d of the outer ring 47 of the bearing 45 does not contact the inner end face 18e of the housing 18, and the outer ring 47 of the bearing 45 is elastically supported by the elastic member 52 in the axial direction.

When the steering wheel 13 is operated by the driver, the rotational motion of the steering wheel 13 is transmitted to the rack-and-pinion mechanism 15 via the steering shaft 14, and the reciprocating linear motion of the rack shaft 12 is performed.

In this way, at so-called turning start timing at which the operation of the steering wheel 13 is just started, the motor 70 has not been driven yet. Therefore, in a state where no assist force is applied to the rack shaft 12, the rack shaft 12 makes a reciprocating linear motion through driver's operation of the steering wheel 13.

When the reciprocating linear motion of the rack shaft 12 is performed, friction is generated between the rack shaft 12 and the balls 32 arranged in the thread groove 12a which is formed in the outer periphery of the rack shaft 12. Accordingly, friction is generated between the balls 32 and the ball screw nut 31, between the ball screw nut 31 and the bearing 40, and between the bearing 40 and the elastic support mechanisms 250. In addition, friction is also generated between the ball screw nut 31 and the motor shaft 26, between the motor shaft 26 and the bearing 45, and between the bearing 45 and the elastic support mechanisms 250.

The elastic support mechanism 250 that elastically supports the end face 47b of the outer ring 47 of the bearing 45 will be described as a representative example. The force in the axial direction in which the rack shaft 12 makes a reciprocating linear motion is transmitted from the end face 47b of the outer ring 47 of the bearing 45 to the elastic member 52 of the elastic support mechanism 250. The elastic member 52 that is in contact with the inner end face 18e of the housing 18 is compressed in the axial direction and is deformed, and the outer ring 47 of the bearing 45 moves in the axial direction.

When the outer ring 47 of the bearing 45 moves in the axial direction in this way, mainly, the inner ring 46 of the bearing 45 and the motor shaft 26 move in the axial direction in which the rack shaft 12 makes a reciprocating linear motion. Therefore, at the start timing of turning the steering wheel 13, it is possible to improve the driver's steering feel and suppress tooth noise by reducing friction force based on the reciprocating linear motion of the rack shaft 12.

Even when the elastic member 52 is compressed in the axial direction, the elastic member 52 is prevented from slipping off radially inward because the inner periphery 52a of the elastic member 52 is in contact with the outer periphery 47f of the rib portion 47d of the outer ring 47 of the bearing 45. Furthermore, because the clearance 253 is formed between the outer periphery 52b of the elastic member 52 and the inner periphery 18a of the housing 18, it is possible to cause the elastic member 52 to escape into the clearance 253, or the like.

The rib portion 47d of the outer ring 47 of the bearing 45 does not contact the inner end face 18e of the housing 18 when the elastic member 52 is not compressed with the predetermined load in the axial direction; whereas the rib portion 47d contacts the inner end face 18e of the housing 18 when the elastic member 52 is compressed with the predetermined load in the axial direction. Therefore, the outer ring 47 of the bearing 45 restricts axial movement of the bearing 45, the motor shaft 26, and the like. This prevents a large load from acting on the elastic member 52.

In this way, when the reciprocating linear motion of the rack shaft 12 is started, by driving the motor 70, the motor shaft 26 is rotated in such a direction that the reciprocating linear motion of the rack shaft 12 is assisted. As the motor shaft 26 rotates, the ball screw nut 31 rotates, and assist force is supplied to the reciprocating linear motion of the rack shaft 12 via the balls 32.

As described in detail above, the present embodiment has the following advantageous effects.

(1) The elastic members 52 elastically support the ball screw nut 31 and the motor shaft 26 (cylindrical member) that rotate coaxially with the rack shaft 12 such that the ball screw nut 31 and the motor shaft 26 are movable in the axial direction (direction along the rotation axis P) via the bearings 40, 45. The rib portion 47d (restricting portion) of the outer ring 47 of the bearing 45 restricts radially inward movement of the elastic member 52. Therefore, the rib portion 47d of the outer ring 47 of the bearing 45 is arranged radially inward of the elastic member 52. In this way, the elastic member 52 is less likely to move radially inward due to the rib portion 47d. In addition, by appropriately arranging each elastic member 52, it is possible to suppress deterioration of the driver's steering feel.

(2) The rib portion 47d not only restricts radially inward movement of the elastic member 52 but also restricts axial movement of the outer ring 47 of the bearing 45 by contacting the inner end face 18e of the housing 18, which faces the outer ring 47 of the bearing 45 in the axial direction. Thus, it is possible to suppress excess movement of the cylindrical member and excess compression of the elastic member.

(3) The clearance 253 is formed radially outward of each elastic member 52, at a position between the elastic member 52 and the inner periphery 18a of the housing 18. Therefore, it is possible to cause each elastic member 52 to smoothly escape into the clearance 253.

(4) The elastic member 52 is in contact with the rib portion 47d of the outer ring 47 of the bearing 45. Thus, the elastic member 52 is configured so as not to slip off radially inward of the elastic member 52 without being bonded to the outer ring 47 and the housing 18 by an adhesive agent. Therefore, it is possible to prevent curing of the elastic member due to an adhesive agent. In addition, it is possible to omit bonding process. Therefore, it is possible to reduce the number of processes at the time of assembly.

Next, a seventh example embodiment of the invention will be described below. In the following description, the same components as those in the above-described sixth embodiment will be denoted by the same reference numerals in the sixth embodiment, and the description thereof will be omitted or simplified.

In the sixth embodiment, the rib portion 47d that protrudes in the axial direction from the end face 47b of the outer ring 47 of the bearing 45 toward the inner end face 18e of the housing 18 is arranged. In contrast to this, in the seventh embodiment, as shown in FIG. 14, in an elastic support mechanism 260, there is provided a supporting member 251 that may function as a restricting portion that protrudes in the axial direction from the first inner end face 18f of the housing 18 toward the end face 47b of the outer ring 47 of the bearing 45.

Figure 14:
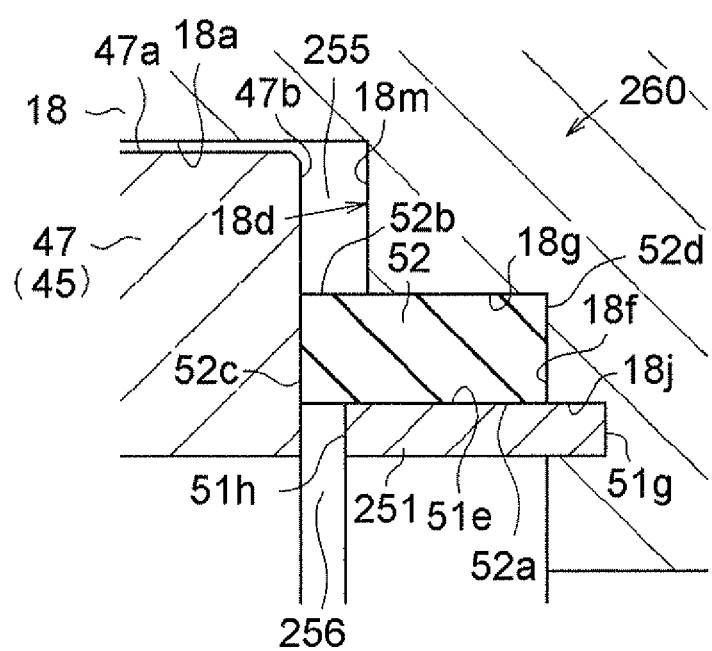
FIG. 14 is a sectional view that shows one of elastic support mechanisms according to a seventh embodiment of the invention.
Figure 15:
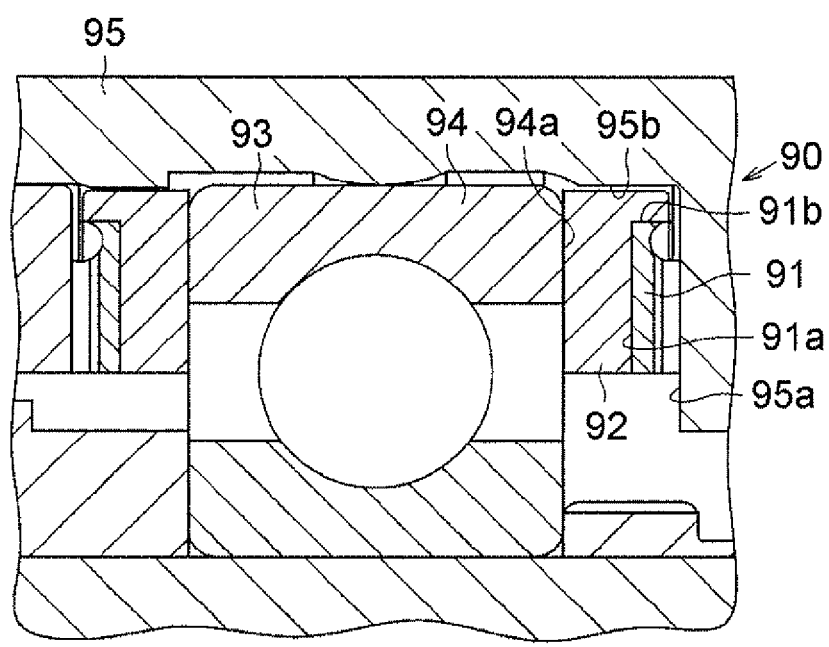
FIG. 15 is a sectional view that illustrates an elastic support mechanism according to related art.

Specifically, as shown in FIG. 14, the annular step portion 18d is formed in the inner end face 18e of the housing 18, and is formed of the first inner end face 18f and the second inner end face 18m. The step portion 18d is formed along the whole circumference of the inner end face 18e so as to face the end face 47b of the outer ring 47 of the bearing 45.

In the step portion 18d, the second inner end face 18m is parallel to the first inner end face 18f, and is formed at a position radially outward of the first inner end face 18f and closer to the outer ring 47 of the bearing 45 than the first inner end face 18f. The inner periphery 18g of the step portion 18d is in contact with the outer periphery 52b of the elastic member 52.

In a state where one end face 52c of the elastic member 152 is in contact with the end face 47b of the outer ring 47 of the bearing 45 and the other end face 52d is in contact with the first inner end face 18f of the housing 18, a clearance 255 is formed between the second inner end face 18m and the end face 47b of the outer ring 47 of the bearing 45. In addition, when the elastic member 52 is compressed in the axial direction between the end face 47b of the outer ring 47 of the bearing 45 and the first inner end face 18f, the elastic member 52 is displaced so as to escape into the clearance 255.

An annular engagement groove 18j is formed in the first inner end face 18f so as to extend in the axial direction. The engagement groove 18j is formed along the whole circumference of the first inner end face 18f so as to face the end face 47b of the outer ring 47 of the bearing 45.

An annular supporting member 251 made of resin is engaged with the engagement groove 18j. The supporting member 251 is formed separately from the housing 18, and is arranged so as to face the end face 47b of the outer ring 47 of the bearing 45 along the whole circumference of the end face 47b. In a state where one end portion 51g of the supporting member 251 is engaged with the engagement groove 18j, the outer periphery 51e of the supporting member 251 is in contact with the inner periphery 52a of the elastic member 52.

In a state where the one end portion 51g of the supporting member 251 is engaged with the engagement groove 18j, a clearance 256 is formed between the other end portion 51h of the supporting member 251 and the end face 47b of the outer ring 47 of the bearing 45. In a state where the one end portion 51g of the supporting member 251 is engaged with the engagement groove 18j, the other end portion 51h of the supporting member 251 is formed closer to the outer ring 47 of the bearing 45 than the second inner end face 18m. Therefore, the outer ring 47 of the bearing 45 is able to be displaced in the axial direction toward the inner end face 18e of the housing 18 until the end face 47b contacts the other end portion 51h of the supporting member 251. In other words, the supporting member 251 restricts axial movement of the bearing 45 and the motor shaft 26 by contacting the end face 47b of the outer ring 47 of the bearing 45.

The operation of the above-configured electric power steering system 10 will be described below. The elastic support mechanism 260 that elastically supports the end face 47b of the outer ring 47 of the bearing 45 will be described as a representative example. The one end portion 51g of the supporting member 251 is engaged with the engagement groove 18j of the housing 18. The inner periphery 52a of the elastic member 52 is in contact with the outer periphery 51e of the supporting member 251. In addition, the one end face 52c of the elastic member 52 is in contact with the end face 47b of the outer ring 47 of the bearing 45, and the other end face 52d of the elastic member 52 is in contact with the first inner end face 18f. The end face 47b of the outer ring 47 of the bearing 45 does not contact the inner end face 18f, 18m or the supporting member 251, and the outer ring 47 of the bearing 45 is elastically supported by the elastic member 52 in the axial direction.

When the steering wheel 13 is operated by the driver, friction is also generated between the motor shaft 26 and the bearing 45 and between the bearing 45 and the elastic support mechanism 260 in accordance with the reciprocating linear motion of the rack shaft 12. The force in the axial direction in which the rack shaft 12 makes a reciprocating linear motion is transmitted from the end face 47b of the outer ring 47 of the bearing 45 to the elastic support mechanism 260. The elastic member 52 that is in contact with the first inner end face 18f is compressed in the axial direction and is deformed, and the outer ring 47 of the bearing 45 moves in the axial direction.

Even when the elastic member 52 is compressed in the axial direction, the elastic member 52 is prevented from slipping off radially inward because the inner periphery 52a of the elastic member 52 is in contact with the outer periphery 51e of the supporting member 251. Furthermore, because the clearance 255 is formed adjacent to the outer periphery 52b of the elastic member 52, it is possible to cause the elastic member 52 to escape into the clearance 255, or the like.

When the elastic member 52 is not compressed with the predetermined load in the axial direction, the distance over which the outer ring 47 of the bearing 45 is moved is shorter than a predetermined distance. Therefore, the supporting member 251 does not contact the end face 47b of the outer ring 47 of the bearing 45. On the other hand, when the elastic member 52 is compressed with the predetermined load in the axial direction, the distance over which the outer ring 47 of the bearing 45 is moved is the predetermined distance. Therefore, the supporting member 251 contacts the end face 47b of the outer ring 47 of the bearing 45. Therefore, the supporting member 251 restricts axial movement of the bearing 45, the motor shaft 26, and the like. This prevents a large load from acting on the elastic member 52.

The above-described embodiments may be modified into the following alternative embodiments.

In the sixth embodiment, the rib portion 47d is formed integrally with the outer ring 47 of the bearing 45. However, the rib portion 47d may be formed separately from the outer ring 47 of the bearing 45.

In the sixth embodiment, the rib portion 47d of the outer ring 47 of the bearing 45 is formed along the whole circumference of the outer ring 47 of the bearing 45. However, the configuration of the rib portion 47d is not limited to this. For example, the rib portion 47d may be formed along part of the circumference of the outer ring 47 instead of being formed along the whole circumference of the outer ring 47. The rib portion 47d may be continuously formed along only part of the circumference of the outer ring 47 or may be formed at predetermined intervals along the circumference of the outer ring 47.

In the sixth embodiment, axial movement of the cylindrical member may be restricted by the inner end face 18e of the housing 18, which is located radially outward of the elastic member 52, instead of being restricted by the rib portion 47d of the outer ring 47 of the bearing 45, which is located radially inward of the elastic member 52. As a matter of course, the axial movement may be restricted by both the rib portion 47d of the outer ring 47 and the inner end face 18e of the housing 18.

In the seventh embodiment, the supporting member 251 is formed separately from the housing 18. However, the configuration of the supporting member 251 is not limited to this. The supporting member 251 may be formed integrally with the housing 18.

In the seventh embodiment, the step portion 18g and the engagement groove 18j of the housing 18 are formed along the whole circumference of the housing 18 so as to face the end face 47b of the outer ring 47 of the bearing 45. However, the configuration of the step portion 18g and the engagement groove 18j are not limited to this. For example, the step portion 18g and the engagement groove 18j may be formed along part of the circumference of the housing 18 instead of being formed along the whole circumference of the housing 18. The step portion 18g and the engagement groove 18j may be continuously formed along only part of the circumference of the housing 18 or may be formed at predetermined intervals along the circumference of the housing 18. Note that the retaining member 251 need not be annular.

In the seventh embodiment, axial movement of the cylindrical member may be restricted by the inner end face 18g of the housing 18, which is located radially outward of the elastic member 52, instead of being restricted by the supporting member 251 that is arranged radially inward of the corresponding elastic member 52. The axial movement of the cylindrical member may be restricted by both the supporting member 251 and the inner end face 18g of the housing 18.

In the above-described embodiments, a protrusion may be formed on the elastic member 52, a recess may formed in the inner end face 18e of the housing 18, and the protrusion and the recess may be engaged with each other. In addition, a recess may be formed in the elastic member 52, a protrusion may be formed on the inner end face 18e of the housing 18, and the recess and the protrusion may be engaged with each other. As a matter of course, the elastic member 52 may be engaged with the rib portion 47d of the outer ring 47 of the bearing 45 in the sixth embodiment or may be engaged with the supporting member 251 in the seventh embodiment, instead of being engaged with the inner end face 18e of the housing 18.

In the above-described embodiments, the elastic member 52 is arranged between the inner end face 18e of the housing 18 and the end face 47b of the outer ring 47 of the bearing 45. However, the position of the elastic member 52 is not limited to this. For example, the elastic member 52 may be arranged between the inner end face of the center nut 35, instead of the housing 18, and the end face 47b of the outer ring 47 of the bearing 45. The center nut 35 is screwed to the inner periphery or inner end face of the housing 18, and is fixedly fitted to the housing 18. That is, a member, such as the center nut, is also included in the housing described in the appended claims.

In the above-described embodiments, the clearance 253, 255 into which the elastic member 52 is caused to escape when the elastic member 52 is compressed in the axial direction is formed adjacent to the outer periphery 52b of the elastic member 52. However, the position of the clearance 253, 255 is not limited to this. For example, as long as a restricting portion is arranged adjacent to the inner periphery 52a of the elastic member 52, a clearance may be formed adjacent to the inner periphery 52a of the elastic member 52. Further, a clearance may be formed on the inner end face 18e of the housing 18 or may be formed adjacent to the outer ring 47 of the bearing 45.

In the above-described embodiments, the elastic member 52 is not bonded to the housing 18 or the bearing 45 by an adhesive agent, or the like. However, there is no problem even if the elastic member 52 is bonded to the housing 18, the bearing 45, or the like, by an adhesive agent, or the like. If an adhesive agent is used as described above, adhesion between each elastic member and the housing or the bearing will be lost over time. However, with the configuration described in the above-described embodiments, it is possible to prevent each elastic member from falling off even if adhesion is lost.

In the above-described embodiments, the thread groove 31a is formed in the entire inner periphery of the ball screw nut 31. However, the configuration of the thread groove 31a is not limited to this. For example, a thread groove may be formed in part of the region of the inner periphery of the ball screw nut 31. In the above-described embodiments, the thread groove 12a is formed in part of the outer periphery of the rack shaft 12. However, the configuration of the thread groove 12a is not limited to this. For example, a thread groove may be formed in the entire outer periphery of the rack shaft 12.

In the above-described embodiments, the bearing 40 located near the ball screw nut 31 to which the motor shaft 26 is screwed and the bearing 45 located near the open end 26a of the motor shaft 26. For example, the invention is desirably applied to another bearing, such as a bearing that is located near the center portion of the motor shaft 26.

In the above-described embodiments, the ball screw nut 31 is slidably supported directly by the bearing 40. However, the motor shaft 26 may be slidably supported by a bearing and the ball screw nut 31 may be indirectly supported.

In the above-described embodiments, the invention may be applied to a rack parallel-type electric power steering system. Specifically, because this configuration has the same configuration as that in the above-described fifth and sixth embodiments, the description is omitted (see FIG. 1).

In the above-described embodiments, the bearing 40 may be a roller bearing in which rollers are employed as rolling elements.

What is claimed is:

1. An electric power steering system, comprising:
a housing;
a cylindrical member that is accommodated in the housing, the cylindrical member having a longitudinal axis extending in an axial direction and having a first thread portion that has a first thread groove formed in an inner periphery of the first thread portion;
a rack shaft that is passed through the cylindrical member coaxially with the cylindrical member, and that has a second thread portion that has a second thread groove formed in an outer periphery of the second thread portion;
a plurality of balls arranged in a rolling passage formed of the first thread groove and the second thread groove;
a bearing that is arranged between an inner periphery of the housing and an outer periphery of the cylindrical member, and that radially supports the cylindrical member with respect to the housing;
an annular elastic member that is made of rubber, the elastic member being arranged between an inner end face of the housing and an outer ring of the bearing, the inner end face facing the bearing in the axial direction, the elastic member supporting the cylindrical member such that the cylindrical member is movable with respect to the housing in the axial direction;
a motor that rotates the cylindrical member; and
a supporting member that restricts axial movement of the cylindrical member within a predetermined range, and that restricts radially inward movement of the elastic member, wherein
the supporting member has a restricting portion that is arranged radially inward of the elastic member and that restricts radially inward movement of the elastic member, and
the inner end face of the housing has a step portion having an inner periphery that slides over an outer periphery of the restricting portion as the supporting member moves in the axial direction.

2. The electric power steering system according to claim 1, wherein
the elastic member is formed such that an inner peripheral portion thereof is thinner than an outer peripheral portion thereof.

3. The electric power steering system according to claim 2, wherein
a recess is formed in an inner periphery of the elastic member.

4. The electric power steering system according to claim 2, wherein
a protrusion is formed on an inner periphery of the elastic member.

5. The electric power steering system according to claim 1, wherein
the restricting portion protrudes away from the outer ring of the bearing in the axial direction.

6. The electric power steering system according to claim 5, wherein
the restricting portion restricts axial movement of the cylindrical member by contacting the inner end face of the housing.

7. The electric power steering system according to claim 1, wherein
the inner periphery of the housing has a relief portion that is a recess and faces the elastic member.

8. The electric power steering system according to claim 1, wherein:
the supporting member has an annular retained portion that is arranged between the outer ring of the bearing and the elastic member; and
the restricting portion has a cylindrical shape and extends from the retained portion in the axial direction.

9. The electric power steering system according to claim 1, wherein
a motor shaft of the motor is arranged parallel to a rotation axis of the rack shaft.

10. The electric power steering system according to claim 1, wherein
a motor shaft of the motor is arranged along a rotation axis of the rack shaft.

* * * * *